(12) United States Patent
Chen et al.

(10) Patent No.: US 12,442,028 B2
(45) Date of Patent: Oct. 14, 2025

(54) METHOD OF OLIGONUCLEOTIDE SYNTHESIS

(71) Applicant: Nuclera Ltd, Cambridge (GB)

(72) Inventors: Michael Chun Hao Chen, Cambridge (GB); Gordon Ross McInroy, Cambridge (GB)

(73) Assignee: NUCLERA LTD., Cambridge (GB)

( * ) Notice: Subject to any disclaimer, the term of this patent is extended or adjusted under 35 U.S.C. 154(b) by 1055 days.

(21) Appl. No.: 17/436,330

(22) PCT Filed: Mar. 9, 2020

(86) PCT No.: PCT/GB2020/050559
§ 371 (c)(1),
(2) Date: Sep. 3, 2021

(87) PCT Pub. No.: WO2020/178604
PCT Pub. Date: Sep. 10, 2020

(65) Prior Publication Data
US 2022/0333145 A1    Oct. 20, 2022

(30) Foreign Application Priority Data
Mar. 7, 2019 (GB) ..................................... 1903056

(51) Int. Cl.
| | |
|---|---|
| *C12P 19/34* | (2006.01) |
| *C12N 9/12* | (2006.01) |
| *C12N 9/24* | (2006.01) |
| *B01J 19/00* | (2006.01) |
| *C12Q 1/6844* | (2018.01) |
| *C40B 50/14* | (2006.01) |

(52) U.S. Cl.
CPC ............ *C12P 19/34* (2013.01); *C12N 9/1252* (2013.01); *C12N 9/2497* (2013.01); *B01J 19/0046* (2013.01); *C12Q 1/6844* (2013.01); *C40B 50/14* (2013.01)

(58) Field of Classification Search
CPC ..... C12P 19/34; C12N 9/1252; C12N 9/2497; C40B 50/14; C12Q 1/6844; B01J 19/0046
See application file for complete search history.

(56) References Cited

U.S. PATENT DOCUMENTS

| | | |
|---|---|---|
| 2003/0068633 A1 | 4/2003 | Belshaw et al. |
| 2005/0106606 A1 | 5/2005 | Parker et al. |
| 2007/0031942 A1 | 2/2007 | Gao et al. |
| 2013/0296194 A1 | 11/2013 | Jacobson et al. |

FOREIGN PATENT DOCUMENTS

| | | |
|---|---|---|
| GB | 2553274 A | 3/2018 |
| WO | 1990/00626 A1 | 1/1990 |
| WO | 1996/07669 A1 | 3/1996 |
| WO | 2007/136834 A2 | 11/2007 |
| WO | 2012/064975 A1 | 5/2012 |
| WO | 2015/175832 A1 | 11/2015 |
| WO | 2017/176541 A1 | 10/2017 |
| WO | 2018/119253 A1 | 6/2018 |
| WO | 2018/152323 A1 | 8/2018 |

OTHER PUBLICATIONS

International Search Report and Written Opinion for Application No. PCT/GB2020/050559, dated Jun. 3, 2020, 9 pages.

*Primary Examiner* — Jezia Riley
(74) *Attorney, Agent, or Firm* — McCarter & English, LLP

(57) ABSTRACT

The invention relates to methods and kits for the synthesis and assembly of oligonucleotides into contiguous strands. The oligonucleotides can be synthesised and assembled in the same device, allowing production of strands longer than can be prepared using base by base synthesis alone.

20 Claims, 3 Drawing Sheets
Specification includes a Sequence Listing.

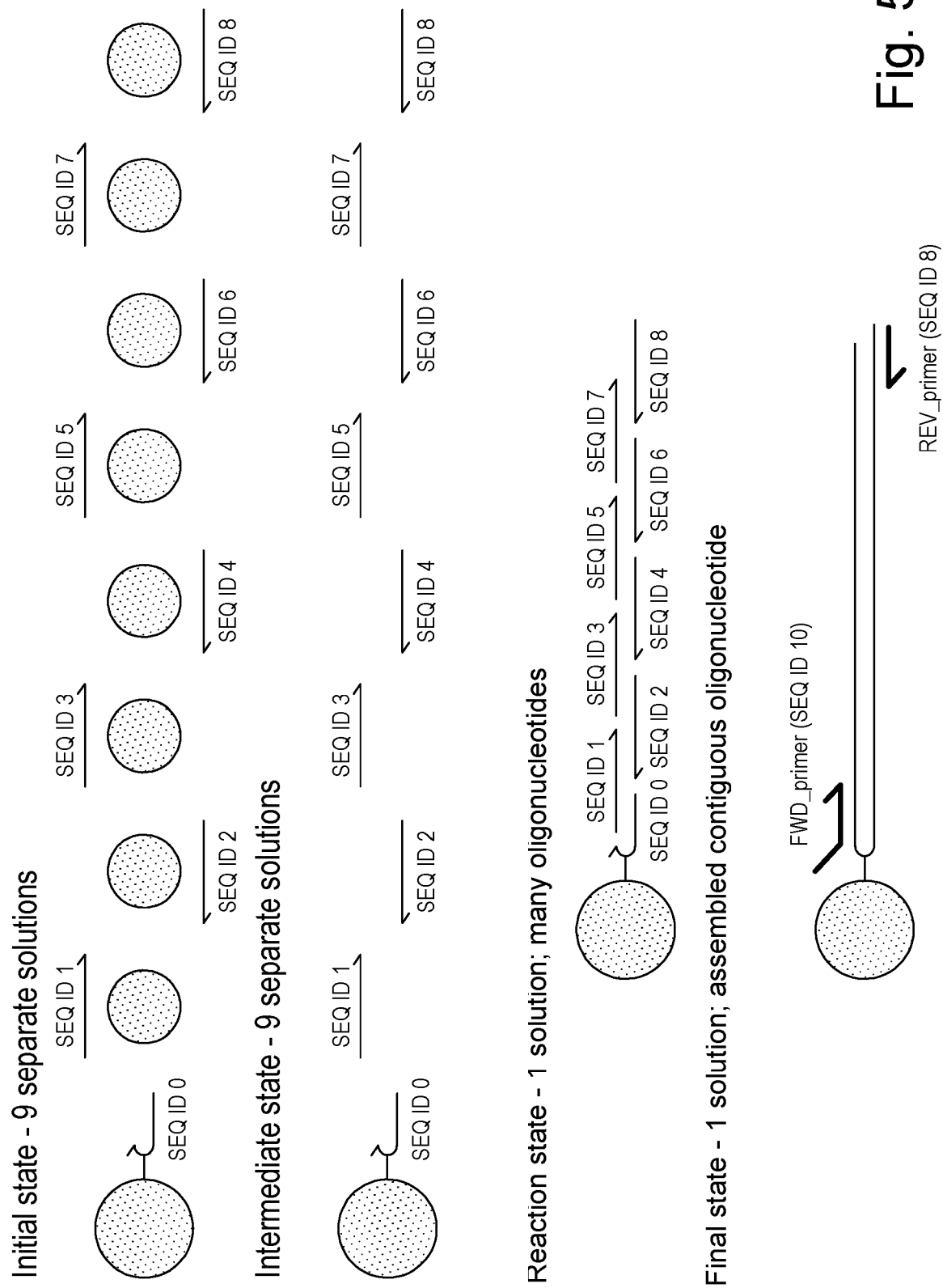

SEQUENCE LISTING

<160> NUMBER OF SEQ ID NOS: 12

<210> SEQ ID NO 1
<211> LENGTH: 494
<212> TYPE: PRT
<213> ORGANISM: Lepisosteus oculatus

<400> SEQUENCE: 1

Met Leu His Ile Pro Ile Phe Pro Pro Ile Lys Lys Arg Gln Lys Leu
1               5                   10                  15

Pro Glu Ser Arg Asn Ser Cys Lys Tyr Glu Val Lys Phe Ser Glu Val
            20                  25                  30

Ala Ile Phe Leu Val Glu Arg Lys Met Gly Ser Ser Arg Arg Lys Phe
        35                  40                  45

Leu Thr Asn Leu Ala Arg Ser Lys Gly Phe Arg Ile Glu Asp Val Leu
    50                  55                  60

Ser Asp Ala Val Thr His Val Val Ala Glu Asp Asn Ser Ala Asp Glu
65                  70                  75                  80

Leu Trp Gln Trp Leu Gln Asn Ser Ser Leu Gly Asp Leu Ser Lys Ile
                85                  90                  95

Glu Val Leu Asp Ile Ser Trp Phe Thr Glu Cys Met Gly Ala Gly Lys
            100                 105                 110

Pro Val Gln Val Glu Ala Arg His Cys Leu Val Lys Ser Cys Pro Val
        115                 120                 125

Ile Asp Gln Tyr Leu Glu Pro Ser Thr Val Glu Thr Val Ser Gln Tyr
    130                 135                 140

-continued

Ala Cys Gln Arg Arg Thr Thr Met Glu Asn His Asn Gln Ile Phe Thr
145                 150                 155                 160

Asp Ala Phe Ala Ile Leu Ala Glu Asn Ala Glu Phe Asn Glu Ser Glu
                165                 170                 175

Gly Pro Cys Leu Ala Phe Met Arg Ala Ala Ser Leu Leu Lys Ser Leu
                180                 185                 190

Pro His Ala Ile Ser Ser Lys Asp Leu Glu Gly Leu Pro Cys Leu
            195                 200                 205

Gly Asp Gln Thr Lys Ala Val Ile Glu Asp Ile Leu Glu Tyr Gly Gln
210                 215                 220

Cys Ser Lys Val Gln Asp Val Leu Cys Asp Asp Arg Tyr Gln Thr Ile
225                 230                 235                 240

Lys Leu Phe Thr Ser Val Phe Gly Val Gly Leu Lys Thr Ala Glu Lys
                245                 250                 255

Trp Tyr Arg Lys Gly Phe His Ser Leu Glu Glu Val Gln Ala Asp Asn
                260                 265                 270

Ala Ile His Phe Thr Lys Met Gln Lys Ala Gly Phe Leu Tyr Tyr Asp
            275                 280                 285

Asp Ile Ser Ala Ala Val Cys Lys Ala Glu Ala Gln Ala Ile Gly Gln
290                 295                 300

Ile Val Glu Glu Thr Val Arg Leu Ile Ala Pro Asp Ala Ile Val Thr
305                 310                 315                 320

Leu Thr Gly Gly Phe Arg Arg Gly Lys Glu Cys Gly His Asp Val Asp
                325                 330                 335

Phe Leu Ile Thr Thr Pro Glu Met Gly Lys Glu Val Trp Leu Leu Asn
                340                 345                 350

Arg Leu Ile Asn Arg Leu Gln Asn Gln Gly Ile Leu Leu Tyr Tyr Asp
                355                 360                 365

Ile Val Glu Ser Thr Phe Asp Lys Thr Arg Leu Pro Cys Arg Lys Phe
370                 375                 380

Glu Ala Met Asp His Phe Gln Lys Cys Phe Ala Ile Ile Lys Leu Lys
385                 390                 395                 400

Lys Glu Leu Ala Ala Gly Arg Val Gln Lys Asp Trp Lys Ala Ile Arg
                405                 410                 415

Val Asp Phe Val Ala Pro Pro Val Asp Asn Phe Ala Phe Ala Leu Leu
                420                 425                 430

Gly Trp Thr Gly Ser Arg Gln Phe Glu Arg Asp Leu Arg Arg Phe Ala
                435                 440                 445

Arg His Glu Arg Lys Met Leu Leu Asp Asn His Ala Leu Tyr Asp Lys
450                 455                 460

Thr Lys Lys Ile Phe Leu Pro Ala Lys Thr Glu Glu Asp Ile Phe Ala
465                 470                 475                 480

His Leu Gly Leu Asp Tyr Ile Asp Pro Trp Gln Arg Asn Ala
                485                 490

<210> SEQ ID NO 2
<211> LENGTH: 31
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated adenine
<220> FEATURE:

<221> NAME/KEY: modified_base
<222> LOCATION: (24)..(24)
<223> OTHER INFORMATION: fluorescently labeled with i5-TAMK

<400> SEQUENCE: 2
atgggtagca gccatcacca tcatcatcat a                                    31

<210> SEQ ID NO 3
<211> LENGTH: 48
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated cytosine

<400> SEQUENCE: 3
caactgccag aatttctttg ttcatgctgc tatgatgatg atggtgat                  48

<210> SEQ ID NO 4
<211> LENGTH: 48
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated guanine

<400> SEQUENCE: 4
gcagcatgaa caaagaaatt ctggcagttg ttgaagccgt gagcaatg                  48

<210> SEQ ID NO 5
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated cytosine

<400> SEQUENCE: 5
cacgaggcag tgcttttca ttgctcacgg cttcaa                                36

<210> SEQ ID NO 6
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated adenine

<400> SEQUENCE: 6
aaaaagcact gcctcgtgaa aaatctttg aagcactgga aagc                       44

<210> SEQ ID NO 7
<211> LENGTH: 48

```
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated thymine

<400> SEQUENCE: 7
ttttggttgc ggttgccagt gcgctttcca gtgcttcaaa gatttttt                    48

<210> SEQ ID NO 8
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated guanine

<400> SEQUENCE: 8
gcactggcaa ccgcaaccaa aaaaaagtat gaacaagaga ttga                        44

<210> SEQ ID NO 9
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (1)..(1)
<223> OTHER INFORMATION: Phosphorylated adenine

<400> SEQUENCE: 9
acgatcaatc tgcacgcgca catcaatctc ttgttcatac tttt                        44

<210> SEQ ID NO 10
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: Description of Combined DNA/RNA Molecule:
      Synthetic oligonucleotide
<220> FEATURE:
<221> NAME/KEY: modified_base
<222> LOCATION: (1)..(1)
<223> OTHER INFORMATION: Phosphorylated guanine
<220> FEATURE:
<221> NAME/KEY: modified_base
<222> LOCATION: (34)..(34)
<223> OTHER INFORMATION: Biotinylated thymine

<400> SEQUENCE: 10
ggctgctacc catuagatcg gaagagcgtt tttttttac gctcttccga tcua              54

<210> SEQ ID NO 11
<211> LENGTH: 58
<212> TYPE: DNA
<213> ORGANISM: Artificial Sequence
<220> FEATURE:
<223> OTHER INFORMATION: Description of Artificial Sequence: Synthetic
```

```
          oligonucleotide

<400> SEQUENCE: 11
aatgatacgg cgaccaccga gatctacact ctttccctac acgacgctct tccgatct        58

<210> SEQ ID NO 12
<211> LENGTH: 43
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: Description of Combined DNA/RNA Molecule:
      Synthetic oligonucleotide
<220> FEATURE:
<221> NAME/KEY: misc_feature
<222> LOCATION: (1)..(2)
<223> OTHER INFORMATION: Phosphothioate linkage
<220> FEATURE:
<221> NAME/KEY: misc_feature
<222> LOCATION: (2)..(3)
<223> OTHER INFORMATION: Phosphothioate linkage
<220> FEATURE:
<221> NAME/KEY: misc_feature
<222> LOCATION: (3)..(4)
<223> OTHER INFORMATION: Phosphothioate linkage
<220> FEATURE:
<221> NAME/KEY: modified_base
<222> LOCATION: (36)..(36)
<223> OTHER INFORMATION: fluorescently labeled with i6-TAMN

<400> SEQUENCE: 12 ttttttttt tacacgacgc tctuccgatc tagcttcagt ttt                       43
```

METHOD OF OLIGONUCLEOTIDE SYNTHESIS

RELATED APPLICATIONS

This application is a 35 U.S.C. § 371 national stage filing of International Application No. PCT/GB2020/050559, filed Mar. 9, 2020, which claims the benefit of priority to United Kingdom Patent Application No. 1903056.8, filed Mar. 7, 2019.

SEQUENCE LISTING

The instant application contains a Sequence Listing which has been submitted electronically in ASCII format and is hereby incorporated by reference in its entirety. Said ASCII copy, created on May 24, 2022, is named 135815-00501_SL.txt, and is 8,527 bytes in size.

FIELD OF THE INVENTION

The invention relates to methods and kits for the synthesis and assembly of oligonucleotides into contiguous strands. The oligonucleotides can be synthesised and assembled in the same device, allowing production of strands longer than can be prepared using base by base synthesis alone.

BACKGROUND OF THE INVENTION

Nucleic acid synthesis is vital to modern biotechnology. The rapid pace of development in the biotechnology arena has been made possible by the scientific community's ability to artificially synthesise DNA, RNA and proteins.

Artificial DNA synthesis allows biotechnology and pharmaceutical companies to develop a range of peptide therapeutics, such as insulin for the treatment of diabetes. It allows researchers to characterise cellular proteins to develop new small molecule therapies for the treatment of diseases our aging population faces today, such as heart disease and cancer. It even paves the way forward to creating life, as the Venter Institute demonstrated in 2010 when they placed an artificially synthesised genome into a bacterial cell.

However, current DNA synthesis technology does not meet the demands of the biotechnology industry. Despite being a mature technology, it is practically impossible to efficiently synthesise a DNA strand greater than 200 nucleotides in length, and most DNA synthesis companies only offer up to 120 nucleotides. In comparison, an average protein-coding gene is of the order of 2000-3000 contiguous nucleotides, a chromosome is at least a million contiguous nucleotides in length and an average eukaryotic genome numbers in the billions of nucleotides. In order to prepare nucleic acid strands thousands of base pairs in length, all major gene synthesis companies today rely on variations of a 'synthesise and stitch' technique, where overlapping 40-60-mer fragments are synthesised and stitched together by enzymatic copying and extension. Current methods generally allow up to 3 kb in length for routine production.

The reason DNA cannot be chemically synthesised beyond 120-200 nucleotides at a time is due to the current methodology for generating DNA, which uses synthetic chemistry (i.e., phosphoramidite technology) to couple a nucleotide one at a time to make DNA. Even if the efficiency of each nucleotide-coupling step is 99% efficient, it is mathematically impossible to synthesise DNA longer than 200 nucleotides in acceptable yields. The Venter Institute illustrated this laborious process by spending 4 years and 20 million USD to synthesise the relatively small genome of a bacterium.

Known methods of DNA sequencing use template-dependent DNA polymerases to add 3'-reversibly terminated nucleotides to a growing double-stranded substrate. In the 'sequencing-by-synthesis' process, each added nucleotide contains a dye, allowing the user to identify the exact sequence of the template strand. Albeit on double-stranded DNA, this technology is able to produce strands of between 500-1000 bps long. However, this technology is not suitable for de novo nucleic acid synthesis because of the requirement for an existing nucleic acid strand to act as a template.

Various attempts have been made to use a terminal deoxynucleotidyl transferase for de novo single-stranded DNA synthesis. Uncontrolled de novo single stranded DNA synthesis, as opposed to controlled, takes advantage of TdT's deoxynucleotide triphosphate (dNTP) 3' tailing properties on single-stranded DNA to create, for example, homopolymeric adaptor sequences for next-generation sequencing library preparation. In controlled extensions, a reversible deoxynucleotide triphosphate termination technology needs to be employed to prevent uncontrolled addition of dNTPs to the 3'-end of a growing DNA strand. The development of a controlled single-stranded DNA synthesis process through TdT would be invaluable to in situ DNA synthesis for gene assembly or hybridization microarrays as it removes the need for an anhydrous environment and allows the use of various polymers incompatible with organic solvents. However, TdT has not been shown to efficiently add nucleoside triphosphates containing 3'-O-reversibly terminating moieties for building up a nascent single-stranded DNA chain necessary for a de novo synthesis cycle, and thus the synthesis of long strands is inefficient.

There is therefore a need for a new method to efficiently prepare long strands of oligonucleotides in order to provide an improved method of nucleic acid synthesis that is able to overcome the problems associated with currently available methods.

SUMMARY OF THE INVENTION

Described herein are methods and kits for the synthesis and assembly of oligonucleotides into contiguous strands. The oligonucleotides can be synthesised and assembled in the same device, allowing production of strands longer than can be prepared using base by base synthesis alone.

Then device operates by synthesising a large number of oligonucleotides of different sequence. The sequences can be designed such that the ends of the sequences can assemble to form one or more overlapping regions, which can then be used to link together multiple of the synthesised strands into a contiguous sequence.

Disclosed herein is a method for preparing a contiguous oligonucleotide sequence of at least 2 n bases in length, the method comprising:
a. taking a device with a plurality of immobilised initiation oligonucleotide sequences, one or more of which contains a cleavage site;
b. using the initiation oligonucleotide sequences to synthesise a plurality of immobilised oligonucleotide sequences of at least n bases in length, using cycles of extension of reversibly blocked nucleotide monomers;
c. selectively cleaving at least two of the immobilised oligonucleotide sequences of least n bases in length into a reaction solution whilst leaving one or more of the immobilised oligonucleotide sequences attached;

d. hybridizing at least two of the cleaved oligonucleotides to each other, to form a splint, and hybridizing one end of the splint to one of the immobilized oligonucleotide sequences; and e. joining at least one of the cleaved oligonucleotides to the immobilised oligonucleotide sequences, thereby preparing a contiguous oligonucleotide sequence of at least 2 n bases in length.

Once synthesised multiple sequences of length 2 n can be joined together on the same device. Thus the oligonucleotides can be linked together to form contiguous lengths much longer than available by synthesis alone.

The device can take the form of a digital microfluidic device. Digital microfluidic devices consist of a plurality of electrodes arranged on a surface. A dielectric layer (e.g., aluminum oxide) is deposited over the electrodes followed by a hydrophobic coating (e.g., perfluorinated hydrocarbon polymer) atop the dielectric layer. The electrodes may be hardwired or formed from an active matrix thin film transistor (AM-TFT).

In one embodiment, the method further comprises:
f. Coincident or subsequent to step d. in situ error correction of hybridised oligonucleotides to remove sequences having base-pairing mismatch errors.

The error correction can be performed by a mismatch recognising protein, for example MutS. The mismatch recognising protein can be immobilized on a solid support, or tagged to allow pull down via an affinity matrix. Alternatively the error correction can be performed using an enzyme that excises a non-natural base, such as for example uracil DNA glycosylase or formamidopyrimidine DNA glycosylase. The error correction can be performed using a base specific nucleic acid glycosylase such as UDG, hAAG or Fpg References herein to an 'initiator sequence' refer to a short oligonucleotide with a free 5'- or 3'-end which the nucleotide monomers can attach. The initiator sequence can be as short as one base where the strands are produced chemically. In one embodiment, the initiator sequence is a DNA initiator sequence. In an alternative embodiment, the initiator sequence is an RNA initiator sequence.

The strands can be synthesised using chemical or enzymatic means. The cycles of extension can be performed using a template independent polymerase, where the nucleotide monomers are nucleoside triphosphates. Alternatively the cycles of extension can be performed using chemical synthesis, where the nucleotide monomers are nucleoside phosphoramidates.

The joining of the two strands to elongate the immobilised strands can be performed using an enzymatic or non-enzymatic process. The joining can be performed using a non-enzyme catalysed chemical reaction, for example an azide-alkyne dipolar cycloaddition.

Alternatively the joining may be performed using an enzyme catalysed reaction, for example using a nucleic acid ligase. If a ligase is used, the oligonucleotides can be synthesized or cleaved from the support with a 5'-phosphate in order to aid efficient ligation. Cleavage use base excising mechanisms, for example UDG, cleaves the strands leaving a residual 5'-phosphate that can be readily then ligated to an adjacent 3'-OH when making strands contiguous.

The hybridization between the strands can be designed such that the ends of the stands are adjacent and can be directly linked. Alternatively the strands can be prepared with single stranded regions (gaps) which can be filled in by a nucleic acid polymerase.

The length of the synthesized strands can be for example at least 25 bases (n=25). n can be at least 30, 40 or 50 bases. The length of each strand being joined does not have to be the same, n merely refers to a minimum length, rather than an absolute length. A strand of length 25 bases can be attached to strand of 30 bases, and thus each n is at least 25. The length is at least 2 n (55 bases where n is at least 2×25).

A number of the strands can be linked together to form longer contiguous strands. The strands can be at least 10 n in length. The strands can be at least 20 n in length. The strands can be at least 50 n in length, such that strands longer than say 1250 bases can be produced. Where n is 10 for example, typically at least 19 oligonucleotides are required. One remains immobilised and 18 are cleaved from the support. The 18 oligonucleotides assemble in solution into a series of nine overhanging splints. The terminal splint hybridises to the immobilised sequence. The splinted sequences can then be joined to each other and to the immobilised oligonucleotide. The immobilised oligonucleotide is thus extended by the length of at least 10 n. The sequence of 10 n bases remains hybridised to 9 internal oligonucleotides which are only immobilised by hybridisation, which can then be removed. The sequence of 10 n bases can thus be made single stranded simply by denaturing the oligonucleotides which served as the splints.

Disclosed is a method for preparing a contiguous oligonucleotide of at least 3 n bases in length, the method comprising:
a. taking a device with a plurality of immobilised initiation oligonucleotides, 4 or more of which contain a cleavage site;
b. using the initiation oligonucleotides to synthesise a plurality of at least 5 immobilised oligonucleotides of at least n bases in length, using cycles of extension of reversibly blocked nucleotide monomers;
c. selectively cleaving at least 4 of the immobilised oligonucleotides of least n bases in length into solution whilst leaving one or more of the immobilised oligonucleotides attached;
d. hybridizing the cleaved oligonucleotides and immobilised oligonucleotides to each other, to form a series of at least 2 splints;
e. joining at least 2 of the cleaved oligonucleotides to the immobilised oligonucleotide, thereby preparing a contiguous oligonucleotide sequence of at least 3 n bases in length.

Disclosed is a method for preparing a contiguous oligonucleotide of at least 5 n bases in length, the method comprising:
a. taking a device with a plurality of immobilised initiation oligonucleotides, 8 or more of which contain a cleavage site;
b. using the initiation oligonucleotides to synthesise a plurality of at least 9 immobilised oligonucleotides of at least n bases in length, using cycles of extension of reversibly blocked nucleotide monomers;
c. selectively cleaving at least 8 of the immobilised oligonucleotides of least n bases in length into solution whilst leaving one or more of the immobilised oligonucleotides attached;
d. hybridizing the cleaved oligonucleotides and immobilised oligonucleotides to each other, to form a series of at least 4 splints;
e. joining at least 4 of the cleaved oligonucleotides to the immobilised oligonucleotide, thereby preparing a contiguous oligonucleotide sequence of at least 5 n bases in length.

Disclosed is a method for preparing a contiguous oligonucleotide of at least 10 n bases in length, the method comprising:
  a. taking a device with a plurality of immobilised initiation oligonucleotides, 18 or more of which contain a cleavage site;
  b. using the initiation oligonucleotides to synthesise a plurality of at least 19 immobilised oligonucleotides of at least n bases in length, using cycles of extension of reversibly blocked nucleotide monomers;
  c. selectively cleaving at least 18 of the immobilised oligonucleotides of least n bases in length into solution whilst leaving one or more of the immobilised oligonucleotides attached;
  d. hybridizing the cleaved oligonucleotides and immobilised oligonucleotides to each other, to form a series of at least 9 splints;
  e. joining at least 9 of the cleaved oligonucleotides to the immobilised oligonucleotide, thereby preparing a contiguous oligonucleotide sequence of at least 10 n bases in length.

The final contiguous assembled strands can be removed from the support. The removal can be performed by copying/amplification of the strands using non-immobilised primers. Thus the strands obtained by primer extension are non-immobilised. In such cases the original strands remain immobilised, and the material is 'released' by producing non-immobilised copies. Alternatively the contiguous oligonucleotide sequence can be released from being immobilized, for example by chemical or enzymatic treatment which cleaves the strands in a defined location. The selective cleavage can be performed using for example removing a non-canonical base from one or more of the immobilised oligonucleotides and cleaving the strands at the resultant abasic site. The non-canonical base can be uracil or 8-oxoguanine which are removed by uracil DNA glycosylase and formamidopyrimidine DNA glycosylase, respectively. The selective cleavage can be performed using a restriction enzyme specific to a certain double stranded sequence.

The device can take the form or a population of beads. The beads may be magnetic. The beads may be porous. The device may contain a population of beads onto which the plurality of immobilised initiation oligonucleotide sequences are attached, wherein the beads may be porous and wherein a portion of the optionally porous, beads are cleaved to release the oligonucleotide sequences into solution. In order to extend the immobilized sequences, the solution is mixed with the remaining beads.

Disclosed is a method comprising assembly of a double stranded region of at least 20 n bases in length by a process comprising:
  a. using the initiation oligonucleotide sequences to synthesise at least 41 immobilised oligonucleotide sequences of at least n bases in length, using cycles of extension of reversibly blocked nucleotide monomers;
  b. selectively cleaving at least 40 of the immobilised oligonucleotide sequences of least n bases in length into a reaction solution whilst leaving at least one of the immobilised oligonucleotide sequences attached;
  c. hybridizing the cleaved oligonucleotides to each other, to form a series of at least 20 splints, and hybridizing one of the terminal splints to one of the immobilized oligonucleotide sequences;
  d. joining at least 20 of the splints, which are arranged in a series, to each other and to the immobilised oligonucleotide sequences of at least n bases in length, thereby preparing a contiguous double stranded oligonucleotide sequence of at least 20 n bases in length.

The resulting contiguous nucleotide sequence can be at least 200 bases in length. The resulting contiguous nucleotide sequence can be at least 500 bases in length. The resulting contiguous nucleotide sequence can be at least 1000 bases in length. The resulting contiguous nucleotide sequence can be at least 5000 bases in length.

The reversibly blocked nucleoside triphosphates can be 3'-reversibly blocked nucleoside triphosphates wherein the 3'-reversible block is selected from 3'-O—$CH_2N_3$, 3'-O—$CH_2CHCH_2$, 3'-O—$CH_2CH_2CN$, 3'-O—(N=$C(CH_3)_2$) or 3'-O—$NH_2$ 3'-phosphate, 3'-ortho-nitrobenzyl, or 3'-para-nitrobenzyl.

Disclosed is a kit for preparing a contiguous oligonucleotide sequence of at least 2 n bases in length, the kit comprising:
  a. a plurality of 5'- immobilised initiation oligonucleotide sequences, one or more of which contains a uracil or 8-oxoguanine.
  b. 3'-reversibly blocked nucleoside triphosphates, wherein the 3'-reversible block is selected from 3'-O—$CH_2N_3$, 3'-O—$CH_2CHCH_2$, 3'-O—$CH_2CH_2CN$, 3'-O—(N-oxime) or 3'-O—$NH_2$ and a template independent polymerase;
  c. uracil DNA glycosylase or formamidopyrimidine DNA glycosylase;
  d. a mismatch recognising protein; and
  e. a nucleic acid ligase.

DESCRIPTION OF THE FIGURES

FIG. 5: A schematic showing how oligonucleotides of SEQ IDs 2-9 are assembled into a contiguous oligonucleotide with the solid support immobilized oligonucleotide of SEQ ID 10.

DETAILED DESCRIPTION OF THE INVENTION

Figure 1:
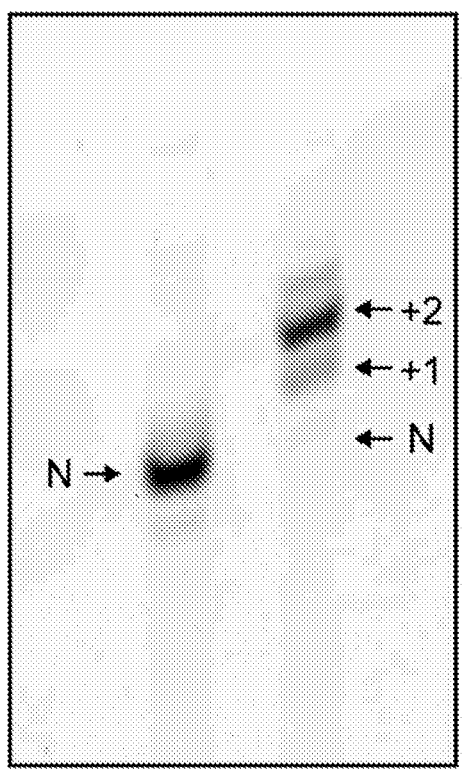
FIG. 1: Denaturing polyacrylamide gel showing DNA products formed by automated enzymatic synthesis of DNA on a solid support. DNA was visualized by virtue of an internal TAMRA fluorophore.

Disclosed herein is a method of assembling synthetic oligonucleotides which can be longer than oligonucleotides available made using base by base synthesis methods alone, For example the oligonucleotides can be longer than 200 bases. The method can be performed on a single solid support on which the oligonucleotides are synthesised, partially removed and then assembled into contiguous lengths.

The process relies on the parallelised assembly of increasing length fragments. Initially a large number of different sequences of length at least n are synthesised. Some of the sequences are cleaved from the support and linked together to form lengths of for example equal to or greater than 2 n, 3n, 4n, 5 n, 10 n etc. A number of sequences of this initial length are prepared in parallel. Following a first cycle of joining, a portion of the longer sequences are cleaved into solution. The cleaved sequences are then stitched together in further cycles of splinted joining. Thus the assembly and joining is performed in parallel. At the simplest level, two sequences of length equal to or greater than 2 n are prepared, one is cleaved and then joined to the non-cleaved, to make a sequence of length 4 n. Two sequences of length 4 n can be joined together to make 8 n etc.

The number of repeats is chosen by the user or an algorithm based on the sequence. Many lengths of n can be joined in a single extension process. Thus for example as described, a length of 3 n can be prepared. A further sequence of length n can be added to make 4 n. Alternatively two sets of sequences of 3 n can be joined, making 6 n length sequences. Three sets of sequences of 3 n can then be joined, therefore making length 9 n. The inventors have exemplified linking 4 splints together to make length 5 n in one assembly step (FIG. 5). If these are all then joined, lengths of 25 n are obtained in two cycles of splinted hybridisation and joining. Where n is say 30 bases, lengths of at least 600 bases of any desired sequence are therefore readily and rapidly assembled. All the steps of synthesis and assembly are performed on the same device, for example a digital microfluidic array.

Oligonucleotides of defined sequences are synthesised using base by base synthesis methods. Thus for example sequences of various lengths of between say 20-50 bases are synthesised. A subset of the sequences are detached into one or more solutions, which can then be allowed to mix and hybridise together. The hybridisation permits assembly of series of splinted joins where the cleaved oligonucleotides can self-assemble. The assembled splints are allowed to hybridise to an immobilised sequence on the solid support. Closing of the gaps across the splints, for example via strand extension and/or direct ligation allows attachment of the oligonucleotides to the support to form a contiguous sequence. It is envisaged that a single process of assembly and joining will be required, but if necessary the process of splinting and joining can be repeated in order to either assembly longer fragments or to ensure efficient assembly of the contiguous sequence.

Disclosed herein is a method for preparing a contiguous oligonucleotide sequence of at least 2 n bases in length, the method comprising:
 a. taking a device with a plurality of immobilised initiation oligonucleotide sequences, one or more of which contains a cleavage site;
 b. using the initiation oligonucleotide sequences to synthesise a plurality of immobilised oligonucleotide sequences of at least n bases in length, using cycles of extension of reversibly blocked nucleotide monomers;
 c. selectively cleaving at least two of the immobilised oligonucleotide sequences of least n bases in length into a reaction solution whilst leaving one or more of the immobilised oligonucleotide sequences attached;
 d. hybridizing at least two of the cleaved oligonucleotides to each other, to form a splint, and hybridizing one end of the splint to one of the immobilized oligonucleotide sequences; and
 e. joining at least one of the cleaved oligonucleotides to the immobilised oligonucleotide sequences, thereby preparing a contiguous oligonucleotide sequence of at least 2 n bases in length.

Any number of repeats of n can be joined in one or more steps of splinted attachment. Once the first joining steps have been performed, the extended fragments can be further combined into longer fragments, thus increasing the lengths.

Disclosed is a method for preparing a contiguous oligonucleotide sequence of at least 4 n bases in length, the method comprising:
 a. taking a device with a plurality of immobilised initiation oligonucleotide sequences, one or more of which contains a cleavage site;
 b. using the initiation oligonucleotide sequences to synthesise a plurality of immobilised oligonucleotide sequences of at least n bases in length, using cycles of extension of reversibly blocked nucleotide monomers;
 c. selectively cleaving at least four of the immobilised oligonucleotide sequences of least n bases in length into solution whilst leaving two or more of the immobilised oligonucleotide sequences attached;
 d. hybridizing the cleaved and immobilised oligonucleotides to each other, to form splints on at least two of the immobilized oligonucleotide sequences;
 e. joining at least one of the cleaved oligonucleotides to at least two of the immobilised oligonucleotide sequences, thereby preparing two discreet contiguous oligonucleotide sequences of at least 2 n bases in length;
 f. performing a further cleavage step of selectively cleaving at least one of the immobilised oligonucleotide sequences of least 2 n bases in length into solution whilst leaving one or more of the immobilised oligonucleotide sequences attached;
 g. further hybridizing at least one of the cleaved oligonucleotides to the cleaved oligonucleotide sequences of least 2 n bases, to form a splint on at least one of the immobilized oligonucleotide sequences of least 2 n bases; and
 h. further joining at least one of the cleaved oligonucleotides of least 2 n bases to the immobilised oligonucleotide sequences of least 2 n bases, thereby preparing a further contiguous oligonucleotide sequence of at least 4 n bases in length.

Disclosed is a method wherein each of the two discreet contiguous oligonucleotide sequences are at least 3 n bases in length and the further contiguous oligonucleotide sequence is of at least 6 n bases in length, the method comprising:
 a. taking a device with a plurality of immobilised initiation oligonucleotides, 4 or more of which contain a cleavage site;
 b. using the initiation oligonucleotides to synthesise a plurality of at least 5 immobilised oligonucleotides of at least n bases in length, using cycles of extension of reversibly blocked nucleotide monomers;
 c. selectively cleaving at least 4 of the immobilised oligonucleotides of least n bases in length into solution whilst leaving one or more of the immobilised oligonucleotides attached;
 d. hybridizing the cleaved oligonucleotides and immobilised oligonucleotides to each other, to form a series of at least 2 splints;
 e. joining at least 2 of the cleaved oligonucleotides to the immobilised oligonucleotide, thereby preparing a contiguous oligonucleotide sequence of at least 3 n bases in length;
 f. performing a further cleavage step of selectively cleaving at least one of the immobilised oligonucleotide sequences of least 3 n bases in length into solution whilst leaving one or more of the immobilised oligonucleotide sequences attached; and;

g. joining two of the contiguous oligonucleotide sequence of at least 3 n bases in length together to form a further contiguous oligonucleotide sequence of at least 6 n bases in length.

Disclosed is a method for preparing a contiguous oligonucleotide sequence of at least 9 n bases in length where n is at least 20, the method comprising:

a. taking a device with a plurality of immobilised initiation oligonucleotides, 16 or more of which contain a cleavage site;

b. using the initiation oligonucleotides to synthesise a plurality of at least 17 immobilised oligonucleotides of at least n bases in length, using cycles of extension of reversibly blocked nucleotide monomers;

c. selectively cleaving at least 12 of the immobilised oligonucleotides of least n bases in length into solution whilst leaving one or more of the immobilised oligonucleotides attached;

d. hybridizing a subset of the cleaved and immobilised oligonucleotides to each other, to form a series of at least 2 splints on at least three of the immobilized oligonucleotide sequences;

e. joining at least 2 of the cleaved oligonucleotides to the immobilised oligonucleotide, thereby preparing at least three contiguous oligonucleotide sequences of at least 3 n bases in length;

f. performing a further cleavage step of selectively cleaving at least two of the immobilised oligonucleotide sequences of least 3 n bases in length, and optionally more of the oligonucleotides of at least n bases in length, into solution whilst leaving one or more of the immobilised oligonucleotide sequences of at least 3 n bases in length attached;

g. hybridizing the cleaved oligonucleotides of at least n bases, the cleaved oligonucleotide sequences of least 3 n bases and the immobilised oligonucleotide sequences of least 3 n bases, to form series of at least 2 splints on at least one of the immobilized oligonucleotide sequences of least 3 n bases; and h. joining at least two of the cleaved oligonucleotides of least 3 n bases to the immobilised oligonucleotide sequences of least 3 n bases, thereby preparing a further contiguous oligonucleotide sequence of at least 9 n bases in length, thereby making an oligonucleotide strand of at least 180 bases in length.

References herein to an 'initiator oligonucleotide' or 'initiator sequence' refer to a short oligonucleotide with a free 3'-end which the 3'-blocked nucleoside triphosphate can be attached to. In one embodiment, the initiator sequence is a DNA initiator sequence. In an alternative embodiment, the initiator sequence is an RNA initiator sequence. References herein to a 'DNA initiator sequence' include a small sequence of DNA which a 3'-blocked nucleotide triphosphate can be attached to, i.e., DNA will be synthesised from the end of the DNA initiator sequence. In one embodiment, the initiator sequence is single-stranded. In an alternative embodiment, the initiator sequence is double-stranded. It will be understood by persons skilled in the art that a 3'-overhang (I.e., a free 3'-end) allows for efficient addition.

In one embodiment, the initiator sequence is immobilised on a solid support. The initiator sequence may be attached to a solid support stable under aqueous conditions so that the method can be easily performed via a flow setup. The term 'attachment' or 'immobilised' refers to a stable immobilisation. The attachment to the support may be via a population of beads where the beads can be selectively moved around the support such that a subset of the beads are not moved and are thus immobilised.

In one embodiment, the initiator sequence is immobilised on a solid support via a reversible interacting moiety, such as a chemically-cleavable linker, an antibody/immunogenic epitope, a biotin/biotin binding protein (such as avidin or streptavidin), or glutathione-GST tag. Therefore, in a further embodiment, the method additionally comprises extracting the resultant nucleic acid by removing the reversible interacting moiety in the initiator sequence, such as by incubating with proteinase K.

In one embodiment, the initiator sequence contains a base or base sequence recognisable by an enzyme. A base recognised by an enzyme, such as a glycosylase, may be removed to generate an abasic site which may be cleaved by chemical or enzymatic means. A base sequence may be recognised and cleaved by a restriction enzyme.

Thus in one embodiment, the resultant contiguous oligonucleotide sequence is released from being immobilised. In one embodiment, this release occurs by removing a non-canonical base from one or more of the immobilised oligonucleotides and cleaving the strands at the resultant abasic site. In one embodiment, the non-canonical base is uracil, which is removed by uracil DNA glycosylase. In an alternate embodiment, the non-canonical base is 8-oxoguanine, which is removed by formamidopyrimidine DNA glycosylase (Fpg).

In an alternate embodiment, the initiator sequence is immobilised on a solid support via a chemically-cleavable linker, such as a disulfide, allyl, or azide-masked hemiaminal ether linker. Therefore, in one embodiment, the method additionally comprises extracting the resultant contiguous oligonucleotide sequence by cleaving the chemical linker through the addition of tris(2-carboxyethyl)phosphine (TCEP) or dithiothreitol (DTT) for a disulfide linker; palladium complexes or an allyl linker; or TCEP for an azide-masked hemiaminal ether linker.

In one embodiment, the cycles of extension are performed using chemical synthesis and the nucleotide monomers are nucleoside phosphoramidates.

In one embodiment, the cycles of extension are performed using a polymerase enzyme and the nucleotide monomers are nucleoside triphosphates. In one embodiment, the cycles of extension are performed using a template independent polymerase and the nucleotide monomers are nucleoside triphosphates. In one embodiment, the cycles of extension are performed using a template independent polymerase and the nucleotide monomers are reversibly blocked nucleoside triphosphates.

In one embodiment, the cycles of extension are performed using a template independent polymerase and the nucleotide monomers are 3'-reversibly blocked nucleoside triphosphates. The 3'-blocked nucleoside 5'-triphosphate can be blocked by any chemical group that can be unmasked to reveal a 3'-OH. The 3'-blocked nucleoside triphosphates can be blocked by a 3'-O-azidomethyl, 3'-aminooxy, 3'O—(N-oxime) (3'-O—N=$CR_1R_2$, where $R_1$ and $R_2$ are each a C1-C3 alkyl group, for example $CH_3$, such that the oxime can be O—N=$C(CH_3)_2$(N-acetoneoxime)), 3'-O-allyl group, 3'-O-cyanoethyl, 3'-O-acetyl, 3'-O-nitrate, 3'-O-phosphate, 3'-O-acetyl levulinic ester, 3'-O-tert butyl dimethyl silane, 3'-O-trimethyl(silyl)ethoxymethyl, 3'-O-ortho-nitrobenzyl, and 3'-O-para-nitrobenzyl.

The 3'-blocked nucleoside 5'-triphosphates can also be blocked by any chemical group that can be directly utilized in chemical ligations, such as copper-catalyzed or copper-free azide-alkyne click reactions and tetrazine-alkene click reactions. The 3'-blocked nucleoside triphosphates can include chemical moieties containing an azide, alkyne, alkene, and tetrazine.

In a particular embodiment, the 3'-reversible block is selected from 3'-O—CH$_2$N$_3$, 3'-O—CH$_2$CHCH$_2$, 3'-O—CH$_2$CH$_2$CN, 3'-O——N=C(CH$_3$)$_2$, 3'-O—NH$_2$ 3'-phosphate, 3'-ortho-nitrobenzyl, or 3'-para-nitrobenzyl.

In one embodiment, the template independent polymerase is a terminal deoxynucleotidyl transferase (TdT). In one embodiment, the template independent polymerase is a modified TdT. In one embodiment, the TdT is added in the presence of an extension solution comprising one or more buffers (e.g., Tris or cacodylate), one or more salts (e.g., Na+, K+, Mg2+, Mn2+, Cu2+, Zn2+, Co2+, etc. all with appropriate counterions, such as Cl) and inorganic pyrophosphatase (e.g., the Saccharomyces cerevisiae homolog). It will be understood that the choice of buffers and salts depends on the optimal enzyme activity and stability. The use of an inorganic pyrophosphatase helps to reduce the build-up of pyrophosphate due to nucleoside triphosphate hydrolysis by TdT. Therefore, the use of an inorganic pyrophosphatase has the advantage of reducing the rate of (1) backwards reaction and (2) TdT strand dismutation.

In one embodiment, the joining is performed using a non-enzyme catalysed chemical reaction. In one embodiment, the joining occurs via an azide-alkyne Huisgen 1,3-dipolar cycloaddition. In one embodiment, the joining occurs via any form of click chemistry known to those skilled in the art.

In one embodiment, the chemical linkage between DNA components may comprise a phosphodiester linkage, a phosphoramidite linkage, a phosphothioester linkage, an ester linkage, an amide linkage or a triazole linkage.

In one embodiment, the chemical linkage between chemically ligated DNA components is read through by a polymerase. In a further embodiment, this polymerase is natural in origin. In an alternate embodiment, this polymerase is an engineered or modified polymerase, In one embodiment, the joining is performed using an enzyme catalysed reaction. In one embodiment, this enzyme is a nucleic acid ligase. In one embodiment, this ligase is of natural origin. In an alternate embodiment, this ligase is of an engineered or modified ligase. In one embodiment, the hybridisation of splints with immobilised oligonucleotides results in a gap which is filled in by a nucleic acid polymerase. Once filled in, the nick can be joined.

In the absence of the splints, the joining of two single stranded sequences is inefficient. The use of the term splint refers to a region of nucleic acid structure having a 5'-end of a first strand and a 3'-end of a second strand, the two strands being held to each other via a third strand which hybridises across the 5'-end of the first and the 3'-end of the second strands. The splints allow efficient joining of the first and second strands, which would be single stranded in the absence of the third oligonucleotide hybridised to both strands. Where one of the first or second strands is immobilised, the splint allows efficient capture and joining of the strands from solution.

The use of the term splint is taken to mean a hybridized structure with three strands. The structure has two complementary double stranded portions. The splinted structure can have single stranded portions at either end, or between the two double stranded portions. The single stranded portion may be made double stranded using a nucleic acid polymerase. Nicks may be joined, for example by a DNA ligase enzyme.

The use of the term splint can equally apply to RNA structures, DNA structures, and RNA-DNA hybrid structures.

Each immobilised oligonucleotide can be extended using multiple splints. In order to make a sequence of length n into a length 3 n, two splints are usually required. Both splinted sequences can be joined in the same step, for example using a ligase. As the extensions can be performed in parallel, multiple splints can be formed on multiple immobilised sequences. Two or more immobilised sequences can be extended by a single step where 2 splits are used per extension, thereby each separate immobilised n becomes 3 n in parallel.

In one embodiment, the error correction is performed using a mismatch recognising protein. In one embodiment, this mismatch recognising protein is MutS. In another embodiment, this mismatch recognising proteins are MutS-MutL, MutS-MutL-MutH, E. coli endonuclease V, T4 endonuclease VII, CEL endonuclease, and/or T7 endonuclease I.

In one embodiment the error correction is made using a uracil DNA glycosylase in order to remove any cytosine bases which have become deaminated, and hence become erroneous uracil bases, during the cycles of strand synthesis. It is clear to those skilled in the art that other glycosylase enzymes may be chosen to remove other erroneous bases, which may have arisen from deamination or other processes. For example, hypoxanthine DNA glycosylase may be used to remove hypoxanthine from DNA, which is a deamination product of adenine, and xanthine DNA glycosylase may be used to remove xanthine from DNA, which is a deamination product of guanine. In one embodiment of the invention, the mismatch recognition protein is introduced alongside single-stranded DNA binding proteins. In an alternate embodiment, the mismatch recognition protein is introduced alongside ATP. In an alternate embodiment, the mismatch recognition protein is introduced alongside both single-stranded DNA binding proteins and ATP.

In one embodiment, the mismatch recognition protein is tagged for pull-down or error-prone sequences by an affinity matrix. In one embodiment the mismatch recognition protein is tagged with a tag selected from: His-tag, Strep-tag, Flag-tag, Arg-tag, MBP-tag, GST-tag, and IgG-tag.

In one embodiment, the mismatch recognition protein is immobilised to a solid support for pull-down of error-prone sequences.

A method of error correction for unligated junctions would be to employ an enzyme that recognizes "nicks" and performs a second opposite nick to form a double strand break (for example the Fragmentase from NEB).

In one embodiment of the invention there is a solid support in the form of for example a planar array and further a plurality of beads onto which a plurality of immobilized initiation oligonucleotide sequences are attached. The beads may be porous and a portion of the, optionally porous, beads are selected as anchors and unselected beads are exposed to harvest solution to cleave them from their solid support to release the oligonucleotide sequences into solution. Thus the term solid support can refer to an array having a plurality of beads which may or may not be immobilised. The oligonucleotides may be attached to, or removed from beads whilst on the array. Thus the immobiilsed oligonucleotide may be attached to a bead, which remains in a fixed position on the array whilst other beads in other locations are subject to cleavage conditions to detach the oligonucleotides from the beads (the beads may or may not be immobilised).

The solid support can take the form of a digital microfluidic device. Digital microfluidic devices consist of a plurality of electrodes arranged on a surface. A dielectric layer (e.g., aluminum oxide) is deposited over the electrodes followed by a hydrophobic coating (e.g., perfluorinated hydrocarbon polymer) atop the dielectric layer. The electrodes may be hardwired or formed from an active matrix thin film transistor (AM-TFT).

The solid support can take the form of a digital microfluidic device. Digital microfluidic devices consist of a plurality of electrodes arranged on a surface. These electrodes can be addressed in a passive manner or by active matrix methods. Passive addressing is a direct address where actuation signals are directly applied on individual electrode (for example by means of a hard-wired connection to that electrode in a single layer or multilayer fashion such as a printed circuit board, PCB). However, a limitation of direct drive methods is the inability to process large numbers of droplets due to difficulties in addressing large numbers of direct drive electrodes. In active matrix addressing, M×N electrodes can be controlled by M+N pins, significantly reducing the number of control pins. However, the resolution of the electrodes (size of electrodes as compared to the size of droplets) limits the scope of droplet operations. Active matrix thin film transistor (AM-TFT) technology enables the control of large numbers of droplets by replacing patterned electrodes with a thin film transistor array, each of which is individually addressable. The increased resolution (small size of pixels on the thin film transistor array) also increases the scope of droplet operations. An AM-TFT digital microfluidic device comprises a dielectric layer (e.g., aluminum oxide) deposited over the electrode layer on the thin-film transistor layer followed by a hydrophobic coating (e.g., perfluorinated hydrocarbon polymer) atop the dielectric layer.

Alternatively the method can be implemented on continuous flow microfluidic devices. One such device consists of a surface with a plurality of microwells each containing a bead. On said bead, an oligonucleotide initiator can be immobilized. In addition to each microwell containing a bead with immobilized initiator, each microwell can contain an electrode to perform electrochemistry.

Cleavage may be performed by cleaving a subset of the immobilised sequences. Thus the attachment of all the oligonucleotides may be using the same cleavable linker, but the cleavage conditions can be localised such that only a subset of the oligonucleotides can be cleaved. Alternatively a portion of the sequences can be attached using a non-cleavable linker.

One embodiment of the invention comprises an amplification step in which the contiguous oligonucleotide sequence is amplified using primers in solution, thereby amplifying the material whilst leaving the original sequence immobilized. Thus a population of contiguous strands are obtained by 'amplifying the sequences off the support'. The original contiguous strands remain immobilised, the copies being amplified using non-immobilised amplification primers.

In one embodiment of the invention, assembly of a double stranded region of at least 20 n bases in length is achieved by a process comprising:
a. using the initiation oligonucleotide sequences to synthesise at least 41 immobilised oligonucleotide sequences of at least n bases in length, using cycles of extension of reversibly blocked nucleotide monomers;
b. selectively cleaving at least 40 of the immobilised oligonucleotide sequences of least n bases in length into a reaction solution whilst leaving at least one of the immobilised oligonucleotide sequences attached;
c. hybridizing the cleaved oligonucleotides to each other, to form a series of at least 20 splints, and hybridizing one of the terminal splints to one of the immobilized oligonucleotide sequences;
d. joining at least 20 of the splints, which are arranged in a series, to each other and to the immobilised oligonucleotide sequences of at least n bases in length, thereby preparing a contiguous double stranded oligonucleotide sequence of at least 20 n bases in length.

One embodiment of the invention is a kit for preparing a contiguous oligonucleotide sequence of at least 2 n bases in length, the kit comprising:
a. a plurality of 5'- immobilised initiation oligonucleotide sequences, one or more of which contains a uracil or 8-oxoguanine.
b. 3'-reversibly blocked nucleoside triphosphates, wherein the 3'-reversible block is selected from 3'-O—CH$_2$N$_3$, 3'-O—CH$_2$CHCH$_2$, 3'-O—CH$_2$CH$_2$CN or 3'-O—NH$_2$ and a template independent polymerase;
c. uracil DNA glycosylase or formamidopyrimidine DNA glycosylase;
d. optionally a mismatch recognising protein; and
e. a nucleic acid ligase.

References herein to 'nucleoside triphosphates' refer to a molecule containing a nucleoside (i.e. a base attached to a deoxyribose or ribose sugar molecule) bound to three phosphate groups. Examples of nucleoside triphosphates that contain deoxyribose are: deoxyadenosine triphosphate (dATP), deoxyguanosine triphosphate (dGTP), deoxycytidine triphosphate (dCTP) or deoxythymidine triphosphate (dTTP). Examples of nucleoside triphosphates that contain ribose are: adenosine triphosphate (ATP), guanosine triphosphate (GTP), cytidine triphosphate (CTP) or uridine triphosphate (UTP). Other types of nucleosides may be bound to three phosphates to form nucleoside triphosphates, such as naturally occurring modified nucleosides and artificial nucleosides.

Therefore, references herein to '3'-blocked nucleoside triphosphates' refer to nucleoside triphosphates (e.g., dATP, dGTP, dCTP or dTTP) which have an additional group on the 3' end which prevents further addition of nucleotides, i.e., by replacing the 3'-OH group with a protecting group. It will be understood that references herein to '3'-block', '3'-blocking group' or '3'-protecting group' refer to the group attached to the 3' end of the nucleoside triphosphate which prevents further nucleotide addition. The present method uses reversible 3'-blocking groups which can be removed by cleavage to allow the addition of further nucleotides. By contrast, irreversible 3'-blocking groups refer to dNTPs where the 3'-OH group can neither be exposed nor uncovered by cleavage.

The 3'-blocked nucleoside 5'-triphosphate can be blocked by any chemical group that can be unmasked to reveal a 3'-OH. The 3'-blocked nucleoside triphosphate can be blocked by a 3'-O-azidomethyl, 3'-aminooxy, 3'-O—(N-oxime) (3'-O—N=CR$_1$R$_2$, where R$_1$ and R$_2$ are each a C1-C3 alkyl group, for example CH$_3$, such that the oxime can be O—N=C(CH$_3$)$_2$ (N-acetoneoxime)), 3'-O-allyl group, 3'-O-cyanoethyl, 3'-O-acetyl, 3'-O-nitrate, 3'-O-phosphate, 3'-O-acetyl levulinic ester, 3'-O-tert butyl dimethyl silane, 3'-O-trimethyl(silyl)ethoxymethyl, 3'-O-ortho-nitrobenzyl, and 3'-O-para-nitrobenzyl.

The 3'-blocked nucleoside 5'-triphosphate can also be blocked by any chemical group that can be directly utilized in chemical ligations, such as copper-catalyzed or copper-free azide-alkyne click reactions and tetrazine-alkene click reactions. The 3'-blocked nucleoside triphosphate can include chemical moieties containing an azide, alkyne, alkene, and tetrazine.

References herein to 'cleaving agent' refer either to a substance which is able to cleave the 3'-blocking group from the 3'-blocked nucleoside triphosphate or to a substance which is able to cleave immobilised oligonucleotides from the solid support. In one embodiment, the cleaving agent is a chemical cleaving agent. In an alternative embodiment, the cleaving agent is an enzymatic cleaving agent. The cleaving can be done in a single step, or can be a multi-step process, for example to transform an oxime (such as for example 3'-O—(N-oxime), 3'-O—N═C(CH$_3$)$_2$, into aminooxy (O—NH$_2$), followed by cleaving the aminooxy to OH.

It will be understood by the person skilled in the art that the selection of cleaving agent is dependent on the type of 3'-nucleoside blocking group used. For instance, tris(2-carboxyethyl)phosphine (TCEP) or tris(hydroxypropyl) phosphine (THPP) can be used to cleave a 3'-O-azidomethyl group, palladium complexes can be used to cleave a 3'-O-allyl group, or sodium nitrite can be used to cleave a 3'-aminoxy group. Therefore, in one embodiment, the cleaving agent is selected from: tris(2-carboxyethyl)phosphine (TCEP), a palladium complex or sodium nitrite.

In one embodiment, the cleaving agent is added in the presence of a cleavage solution comprising a denaturant, such as urea, guanidinium chloride, formamide or betaine. The addition of a denaturant has the advantage of being able to disrupt any undesirable secondary structures in the DNA. In a further embodiment, the cleavage solution comprises one or more buffers. It will be understood by the person skilled in the art that the choice of buffer is dependent on the exact cleavage chemistry and cleaving agent required.

The inventors have previously developed a selection of engineered terminal transferase enzymes, any of which may be used in the current process.

Terminal transferase enzymes are ubiquitous in nature and are present in many species. Many known TdT sequences have been reported in the NCBI database http://www.ncbi.nlm.nih.gov/. The sequences of the various described terminal transferases show some regions of highly conserved sequence, and some regions which are highly diverse between different species.

The inventors have modified the terminal transferase from *Lepisosteus oculatus* TdT (spotted gar) (shown below). However the corresponding modifications can be introduced into the analagous terminal transferase sequences from any other species, including the sequences listed above in the various NCBI entries.

The amino acid sequence of the spotted gar (*Lepisosteus oculatus*) is shown below (SEQ ID NO 1)

MLHIPIFPPIKKRQKLPESRNSCKYEVKFSEVAIFLVERKMGSSRRKFLT

NLARSKGFRIEDVLSDAVTHVVAEDNSADELWQWLQNSSLGDLSKIEVLD

-continued

ISWFTECMGAGKPVQVEARHCLVKSCPVIDQYLEPSTVETVSQYACQRRT

TMENHNQIFTDAFAILAENAEFNESEGPCLAFMRAASLLKSLPHAISSSK

DLEGLPCLGDQTKAVIEDILEYGQCSKVQDVLCDDRYQTIKLFTSVFGVG

LKTAEKWYRKGFHSLEEVQADNAIHFTKMQKAGFLYYDDISAAVCKAEAQ

AIGQIVEETVRLIAPDAIVTLTGGFRRGKECGHDVDFLITTPEMGKEVWL

LNRLINRLQNQGILLYYDIVESTFDKTRLPCRKFEAMDHFQKCFAIIKLK

KELAAGRVQKDWKAIRVDFVAPPVDNFAFALLGWTGSRQFERDLRRFARH

ERKMLLDNHALYDKTKKIFLPAKTEEDIFAHLGLDYIDPWQRNA

The inventors have identified various regions in the amino acid sequence having improved properties. Certain regions improve the solubility and handling of the enzyme. Certain other regions improve the ability to incorporate nucleotides with modifications at the 3'-position. Suitable enzymes are described in application PCT/GB2020/050247.

The terminal transferase or modified terminal transferase can be any enzyme capable of template independent strand extension. The modified terminal deoxynucleotidyl transferase (TdT) enzyme can comprise amino acid modifications when compared to a wild type sequence SEQ ID NO 1 or a truncated version thereof or the homologous amino acid sequence of a terminal deoxynucleotidyl transferase (TdT) enzyme in other species or the homologous amino acid sequence of Polμ, Polβ, Polλ, and Polθ of any species or the homologous amino acid sequence of X family polymerases of any species, wherein the amino acid is modified at one or more of the amino acids:
V32, A33, I34, F35, A53, V68, V71, E97, I101, M108, G109, A110, Q115, V116, S125, T137, Q143, M152, E153, N154, H155, N156, Q157, I158, I165, N169, N173, S175, E176, G177, P178, C179, L180, A181, F182, M183, R184, A185, L188, H194, A195, I196, S197, S198, S199, K200, E203, G204, D210, Q211, T212, K213, A214, I216, E217, D218, L220, Y222, V228, D230, Q238, T239, L242, L251, K260, G261, F262, H263, S264, L265, E267, Q269, A270, D271, N272, A273, H275, F276, T277, K278, M279, Q280, K281, S291, A292, A293, V294, C295, K296, E298, A299, Q300, A301, Q304, I305, T309, V310, R311, L312, I313, A314, I318, V319, T320, G328, K329, E330, C331, L338, T341, P342, E343, M344, G345, K346, W349, L350, L351, N352, R353, L354, I355, N356, R357, L358, Q359, N360, Q361, G362, I363, L364, L365, Y366, Y367, D368, I369, V370, K376, T377, C381, K383, D388, H389, F390, Q391, K392, F394, I397, K398, K400, K401, E402, L403, A404, A405, G406, R407, D411, A421, P422, P423, V424, D425, N426, F427, A430, R438, F447, A448, R449, H450, E451, R452, K453, M454, L455, L456, D457, N458, H459, A460, L461, Y462, D463, K464, T465, K466, K467, T474, D477, D485, Y486, I487, D488, P489.

Modifications which improve the solubility include a modification within the amino acid region WLLNRLINRLQNQGILLYYDIV shown highlighted in the sequence below.

MLHIPIFPPIKKRQKLPESRNSCKYEVKFSEVAIFLVERKMGSSRRKFLTNLARSKGFRIEDVLSDAVTHVVAEDNSAD

ELWQWLQNSSLGDLSKIEVLDISWFTECMGAGKPVQVEARHCLVKSCPVIDQYLEPSTVETVSQYACQRRTTMEN

HNQIFTDAFAILAENAEFNESEGPCLAFMRAASLLKSLPHAISSSKDLEGLPCLGDQTKAVIEDILEYGQCSKVQDVLC

DDRYQTIKLFTSVFGVGLKTAEKWYRKGFHSLEEVQADNAIHFTKMQKAGFLYYDDISAAVCKAEAQAIGQIVEET

-continued

```
VRLIAPDAIVTLTGGFRRGKECGHDVDFLITTPEMGKEVWLLNRLINRLQNQGILLYYDIVESTFDKTRLPCRKFEAM

DHFQKCFAIIKLKKELAAGRVQKDWKAIRVDFVAPPVDNFAFALLGWTGSRQFERDLRRFARHERKMLLDNHALY

DKTKKIFLPAKTEEDIFAHLGLDYIDPWQRNA
```

Modifications which improve the incorporation of modified nucleotides can be at one or more of selected regions shown below. The second modification can be selected from one or more of the amino acid regions VAIF, EDN, MGA, ENHNQ, FMRA, HAI, TKA, FHS, QADNA, MQK, SAAVCK, EAQA, TVR, KEC, TPEMGK, DHFQ, LAAG, APPVDN, FARHERKMLLDNHA, and YIDP shown highlighted in the sequence below.

Improved sequences as described herein can contain both modifications, namely
a. a first modification is within the amino acid region WLLNRLINRLQNQGILLYYDI of the sequence of SEQ ID NO 1 or the homologous region in other species; and
b. a second modification is selected from one or more of the amino acid regions VAIF, EDN, MGA, ENHNQ,

```
MLHIPIFPPIKKRQKLPESRNSCKYEVKFSEVAIFLVERKMGSSRRKFLTNLARSKGFRIEDVLSDAVTHVVAEDNSAD

ELWQWLQNSSLGDLSKIEVLDISWFTECMGAGKPVQVEARHCLVKSCPVIDQYLEPSTVETVSQYACQRRTTMEN

HNQIFTDAFAILAENAEFNESEGPCLAFMRAASLLKSLPHAISSSKDLEGLPCLGDQTKAVIEDILEYGQCSKVQDVLC

DDRYQTIKLFTSVFGVGLKTAEKWYRKGFHSLEEVQADNAIHFTKMQKAGFLYYDDISAAVCKARAQAIGQIVEET

VRLIAPDAIVTLTGGFRRGKECGHDVDFLITTPEMGKEVWLLNRLINRLQNQGILLYYDIVESTFDKTRLPCRKFEAM

DHFQKCFAIIKKELAAGRVQKDWKAIRVDFVAPPVDNFAFALLGWTGSRQFERDLRRFARHERKMLLDNHALY

DKTKKIFLPAKTEEDIFAHLGLDYIDPWQRNA
```

Described herein is a modified terminal deoxynucleotidyl transferase (TdT) enzyme comprising at least one amino acid modification when compared to a wild type sequence SEQ ID NO 1 or the homologous amino acid sequence of a terminal deoxynucleotidyl transferase (TdT) enzyme in other species, wherein the modification is selected from one or more of the amino acid regions WLLNRLINRLQNQGILLYYDI, VAIF, EDN, MGA, ENHNQ, FMRA, HAI, TKA, FHS, QADNA, MQK, SAAVCK, EAQA, TVR, KEC, TPEMGK, DHFQ, LAAG, APPVDN, FARHERKMLLDNHA, and YIDP of the sequence of SEQ ID NO 1 or the homologous regions in other species.

Homologous refers to protein sequences between two or more proteins that possess a common evolutionary origin, including proteins from superfamilies in the same species of organism as well as homologous proteins from different species. Such proteins (and their encoding nucleic acids) have sequence homology, as reflected by their sequence similarity, whether in terms of percent identity or by the presence of specific residues or motifs and conserved positions. A variety of protein (and their encoding nucleic acid) sequence alignment tools may be used to determine sequence homology. For example, the Clustal Omega multiple sequence alignment program provided by the European Molecular Biology Laboratory (EMBL) can be used to determine sequence homology or homologous regions.

FMRA, HAI, TKA, FHS, QADNA, MQK, SAAVCK, EAQA, TVR, KEC, TPEMGK, DHFQ, LAAG, APPVDN, FARHERKMLLDNHA, and YIDP of the sequence of SEQ ID NO 1 or the homologous regions in other species.

The modification within the region WLLNRLINRLQNQGILLYYDIV or the corresponding region from other species help improve the solubility of the enzyme. The modification within the amino acid region WLLNRLINRLQNQGILLYYDIV can be at one or more of the underlined amino acids.

Particular changes can be selected from W-Q, N—P, R—K, L-V, R-L, L-W, Q-E, N—K, Q-K or I-L.

The sequence WLLNRLINRLQNQGILLYYDIV can be altered to QLLPKVINLWEKKGLLLYYDLV.

The second modification improves incorporation of nucleotides having a modification at the 3' position in comparison to the wild type sequence. The second modification can be selected from one or more of the amino acid regions VAIF, EDN, MGA, ENHNQ, FMRA, HAI, TKA, FHS, QADNA, MQK, SAAVCK, EAQA, TVR, KEC, TPEMGK, DHFQ, LAAG, APPVDN, FARHERKMLL-DNHA, and YIDP of the sequence of SEQ ID NO 1 or the homologous regions in other species. The second modification can be selected from two or more of the amino acid regions VAIF, EDN, MGA, ENHNQ, FM RA, HAI, TKA, FHS, QADNA, MQK, SAAVCK, EAQA, TVR, KEC, TPEMGK, DHFQ, LAAG, APPVDN, FARHERKMLL- DNHA, and YIDP of the sequence of SEQ ID NO 1 or the homologous regions in other species shown highlighted in the sequence below.

MLHIPIFPPIKKRQKLPESRNSCKYEVKFSEVAIFLVERKMGSSRRKFLTNLARSKGFRIEDVLSDAVTHVVAEDNSAD

ELWQWLQNSSLGDLSKIEVLDISWFTECMGAGKPVQVEARHCLVKSCPVIDQYLEPSTVETVSQYACQRRTTMEN

HNQIFTDAFAILAENAEFNESEGPCLAPMRAASLLKSLPHAISSSKDLEGLPCLGDQIKAVIEDILEYGQCSKVQDVLC

DDRYQTIKLFTSVFGVGLKTAEKWYRKGFHSLEEVQADNAIHFTKMQKAGFLYYDDISAAVCKAEAQAIGQIVEET

VRLIAPDAIVTLTGGFRRGKECGHDVDFLITTPEMGKEVWLLNRLINRLQNQGILLYYDIVESTFDKTRLPCRKFEAM

DHPQKCFAIIKKELAAGRVQKDWKAIRVDFVAPPVDNFAFALLGWTGSRQFERDLRRFARHERKMLLDNHALY

DKTKKIFLPAKTEEDIFAHLGLDYIDPWQRNA

The identified positions commence at positions V32, E74, M108, F182, T212, D271, M279, E298, A421, L456, Y486. Modifications disclosed herein contain at least one modification at the defined positions.

The modified amino acid can be in the region FMRA. The modified amino acid can be in the region QADNA. The modified amino acid can be in the region EAQA. The modified amino acid can be in the region APP. The modified amino acid can be in the region LDNHA. The modified amino acid can be in the region YIDP. The region FARHERKMLLDNHA is advantageous for removing substrate biases in modifications. The FARHERKMLLDNHA region appears highly conserved across species.

The modification selected from one or more of the amino acid regions FMRA, QADNA, EAQA, APP, FARHERKMLLDNHA, and YIDP can be at the underlined amino acid(s).

The positions for modification can include A53, V68, V71, D75, E97, I101, G109, Q115, V116, S125, T137, Q143, N154, H155, Q157, I158, I165, G177, L180, A181, M183, A195, K200, T212, K213, A214, E217, T239, F262, S264, Q269, N272, A273, K281, S291, K296, Q300, T309, R311, E330, T341, E343, G345, N352, N360, Q361, I363, Y367, H389, L403, G406, D411, A421, P422, V424, N426, R438, F447, R452, L455, and/or D488.

Amino acid changes include any one of A53G, V681, V711, D75N, D750, E97A, I101V, G109E, G109R, Q115E, V116I, V116S, S125R, T137A, Q143P, N154H, H155C, Q157K, Q157R, I158M, I165V, G177D, L180V, A181E, M183R, A195P, K200R, T212S, K213S, A214R, E217Q, T239S, F262L, S264T, Q269K, N272K, A273S, A273T, K281R, S291N, K296R, Q300D, T309A, R311W, E330N, T341S, E343Q, G345R, N352Q, N360K, Q361K, I363L, Y367C, H389A, L403R, G406R, D411N, A421L, A421M, A421V, P422A, P422C, V424Y, N426R, R438K, F447W, R452K, L455I, and/or D488P.

Amino acid changes include any two or more of A53G, V681, V711, D75N, D750, E97A, I101V, G109E, G109R, Q115E, V1161, V116S, S125R, T137A, Q143P, N154H, H155C, Q157K, Q157R, I158M, I165V, G177D, L180V, A181E, M183R, A195P, K200R, T212S, K213S, A214R, E217Q, T239S, F262L, S264T, Q269K, N272K, A273S, A273T, K281R, S291N, K296R, Q300D, T309A, R311W, E330N, T341S, E343Q, G345R, N3520, N360K, Q361K, I363L, Y367C, H389A, L403R, G406R, D411N, A421L, A421M, A421V, P422A, P422C, V424Y, N426R, R438K, F447W, R452K, L455I, and/or D488P.

The modification of QADNA to KADKA, QADKA, KADNA, QADNS, KADNT, or QADNT is advantageous for the incorporation of 3'-O-modified nucleoside triphosphates to the 3'-end of nucleic acids and removing substrate biases during the incorporation of modified nucleoside triphosphates. The modification of APPVDN to MCPVDN, MPPVDN, ACPVDR, VPPVDN, LPPVDR, ACPYDN, LCPVDN, or MAPVDN is advantageous for the incorporation of 3'-O-modified nucleoside triphosphates to the 3'-end of nucleic acids and removing substrate biases during the incorporation of modified nucleoside triphosphates. The modification of FARHERKMLLDRHA to WARHERKMILDNHA, FARHERKMILDNHA, WARHERKMLLDNHA, FARHERKMLLDRHA, or FARHEKKMLLDNHA is also advantageous for the incorporation of 3'-O-modified nucleoside triphosphates to the 3'-end of nucleic acids and removing substrate biases during the incorporation of modified nucleoside triphosphates.

The modification can be selected from one or more of the following sequences FRRA, QADKA, EADA, MPP, FARHERKMLLDRHA, and YIPP. Included is a modified terminal deoxynucleotidyl transferase (TdT) enzyme wherein the second modification is selected from two or more of the following sequences FRRA, QADKA, EADA, MPP, FARHERKMLLDRHA, and YIPP. Included is a modified terminal deoxynucleotidyl transferase (TdT) enzyme wherein the second modification contains each of the following sequences FRRA, QADKA, EADA, MPP, FARHERKMLLDRHA, and YIPP.

Instrument Process

The process can be carried out on a synthesis instrument. The instrument should be capable of controlled fluidic manipulations such as for example controlled movement and combination or splitting of fluidic droplets. The instrument may consist of the following items:

A. A kit, comprising a digital microfluidic (DMF) technology, and optionally on board microfluidic reservoirs storing reagents, and/or a reagent cartridge.

B. Hardware controller, consisting of required electronics to control the DMF technology and any associated fluidic or mechanical systems.

C. Additional fluidics, such as bulk washing lines.

D. A box to house the constituent instrument parts (A-C), any auxiliary instrument parts (such as motors, syringe pumps, pipette heads, heating and cooling modules, imaging modules, and sensors for temperature, humidity, light, and pH) and provide interface points (such as for internet connection, display, processing power).

The instrument will perform the following functions:

1. Nucleic acid synthesis, such as phosphoramidite chemistry or non-templated enzymatic nucleic acid synthesis, or more specifically, terminal deoxynucleotidyl transferase (TdT) mediated addition of 3'-O-reversibly terminated nucleoside 5'-triphosphates to the 3'-end of 5'-immobilized nucleic acids.
2. Oligonucleotide assembly of oligonucleotides synthesized during (1), such as through bead-based iterative splint ligation assembly.
3. Either direct harvesting of the assembled nucleic acid product or further on board amplification, such as through polymerase chain reaction.
4. Optionally, if the nucleic acid products synthesized through 1-3 are to be used for protein expression, the nucleic acid products will be moved to a module capable of performing protein expression. Protein expression can be performed via cell-free or cell-based protein synthesis. More specifically, cell-free protein synthesis would be preferred.

The user inputs the desired sequence to the control software (either through peripheral devices and displays connected to the instrument or remotely via a cloud-based service) and places the cartridge into the instrument. Algorithms disassemble desired sequences into 30-1000 nt fragments (preferably 50-500 nt fragments, and most preferably 50-200 nt fragments) with respective splints.

During enzymatic nucleic acid synthesis, the following steps may be taken on the instrument:

I. Addition solution containing TdT, pyrophosphatase (PPiase), 3'-O-reversibly terminated dNTPs, and required buffer (including salts and necessary reaction components such as metal divalents) is brought to a reaction zone containing an immobilized nucleic acid, where the nucleic acid is immobilized on a surface such as through magnetic beads with 5'-immobilization chemistry. The initial immobilized nucleic acid may be known as an initiator strand and comprises N nucleotides, for example 3-100 nucleotides, preferably 10-80 nucleotides, and more preferably 20-65 nucleotides. Initiator strands may contain a cleavage site, such as a restriction site or a non-canonical DNA base such as U or 8-oxoG. Addition solution may optionally contain a phosphate sensor, such as *E. coli* phosphate-binding protein conjugated to MDCC fluorophore, to assess the quality of nucleic acid synthesis as a fluorescent output. dNTPs can be combined in ratios to make DNA libraries, such as NNK syntheses.

II. Wash solution, either in bulk or in discrete droplets, is applied to reaction zones to wash away the addition solution.

III. Deprotection solution, either in bulk or in discrete droplets, is applied to reaction zones to deprotect the 3'-O-reversible terminator added to the immobilized nucleic acids in the immobilized nucleic acid zone in step I IV. Wash solution, either in bulk or in discrete droplets, is applied to reaction zones to wash away the deprotection solution.

V. Steps I-IV are repeated until desired sequences are synthesized, for example steps I-IV are repeated 50, 100, 200 or 1000 times.

An exemplary process in numerical terms is below. 287 sequences of length n are prepared, where each n varies between 20-50 bases (making n at least 20). Each sequence is prepared at a discreet location on a solid support, attached via a bead. 200 of the sequences are cleaved into discreet droplets, the array allowing each droplet to be kept isolated until needed (200 n are cleaved, 87 remain immobilised). 200 of the droplets are combined into 50 merged solutions each having 4 sequences capable of end to end (ungapped) hybridization. Each of the 50 merged solutions can be exposed to one area having an uncleaved immobilised sequence n. The sequences can be joined together, for example using a DNA ligase, thereby extending each of the 50 immobilised 'areas' to a length 3 n (at least 60 bases). 37 of the immobilised sequences n remain unextended for use as splints later in the process. A subset of these extended or remaining unextended areas can be cleaved. For example 40 of the 50 3 n (60 base) sections can be cleaved. The splints can be length n, so can come from the original pool of 287 fragments of length n, of which 37 remain unused, or can be extended fragments from the pool of 50 fragments of length 3 n.

If the splints are the 3 n sequences. The pool of 40 cleaved 3 n lengths can be merged into 10 pools of 4. Each pool can be used to make one of the remaining 40 immobilised areas length 9 n (at least 180 bases).

If the splints are the n sequences, the 40 pools can be merged into 10 pools. Each pool has 4 sequences of length 3 n, plus 3 splints of length n cleaved from the remaining 50 n sequences. Thus after joining the splints, each immobilised fragment is 5 sets of 3 n (15 n or at least 300 bases) in length. A further 30 (3 per pool) original n sequences are used as splints. Now 10 immobilised fragments of 15 n in length remain along with 7 unused n fragments.

8 of the 10 extended 'areas' can be cleaved, splinted and joined. Whilst splints of length 9 n can be used, n would be more common. Thus 8 of the 10 the 15 n fragments are cleaved into 8 pools. The 8 pools are merged into 2 pools of 4. Each pool also has 3 defined n sequences to hybridise as splints across the fragment ends. Thus a further 6 n sequences (of the remaining 7) are used. Joining the assembled fragments allows 5 sets of 15 n to be joined together (giving 2 immobilised fragments each now 70 n (at least 1400 bases) in length).

As the fragments are now at least 1400 bases in length, joining multiple fragments may be more difficult, so the length is optionally only doubled on the last cycle. One of the two remaining areas is cleaved, splinted via the further remaining n and joined thus making a contiguous sequence of length 140 n (2800-7000 bases). This extended material is the only sequence remaining immobilised.

The values of n, pool sizes and numbers are shows for exemplification and understanding of the method. The number of bases added per cycle may vary depending on the parallelisation and sequence designs.

During the process the device may be heated and cooled as required for denaturation and hybridisation, and further reagents may be added via merging droplets. Reagents may include ligases, cofactors, denaturing solutions, and buffered aqueous solutions optionally containing divalent metal ions and/or monovalent metal ions. Where the materials are immobilised, reagents can be removed by washing and fluid exchange.

During oligonucleotide assembly and optional error correction:

I. Selected beads containing specific oligonucleotide sequences synthesized above across the chip are chosen as "anchors."

II. Unselected beads are exposed to harvest solution to cleave them from their solid support, such as UDG/DMED containing solutions to cleave U bases present in initiator DNA strands. Droplets containing DNA in solution from these non-anchor positions are combined with anchor positions in an iterative process.

III. Intermittently, ligation solutions will be introduced to anchor positions to introduce ligases, such as T4 DNA ligase, and appropriate ligation buffers, such as ATP containing buffers. Further ligation solution is intermittently introduced to maintain the concentration of the components necessary for enzymatic ligation to occur. Ligation may occur by chemical rather than enzymatic means, such as via an azide-alkyne Huisgen 1,3-dipolar cycloaddition or other forms of click chemistry known to those skilled in the art. The chemical linkage between DNA components may comprise a phosphodiester linkage, a phosphoramidite linkage, a phosphothioester linkage, an ester linkage, an amide linkage or a triazole linkage. The chemical linkage between chemically ligated DNA components should preferably be read through by polymerases, either of natural or engineered origin.

IV. Coincident or subsequent to the introduction of ligation solutions, error correction solutions will be introduced to anchor positions so as to introduce mismatch recognition proteins (e.g., MutS). Optionally, mismatch recognition proteins are introduced in the presence of single-stranded DNA binding proteins (SSBs) and/or ATP in order to increase the specificity of mismatch recognition proteins for mismatches, insertions, and deletions. In a particular embodiment, the mismatch recognition protein is tagged (e.g., His-tag, Strep-tag, Flag-tag, etc.) for pull-down of error-prone sequences by an affinity matrix. In another embodiment, the mismatch recognition protein is immobilized to a solid support for pull-down of error-prone sequences. Importantly, it is advantageous to include mismatch recognition proteins during intermediate assembly stages rather than final assembly stages due to the following: the longer a piece of assembled nucleic acid molecule becomes, the greater the likelihood of an error occurring. Thus, introducing mismatch repair proteins in the final assembly stages has a greater probability of pulling down nearly all assembled nucleic acid molecules whereas introducing mismatch repair proteins during intermediate assembly stages decreases this probability.

The final product or products should be transferred from the chip to a collection site, collection vessel, or a downstream module such as described above.

GENERAL DESCRIPTION OF METHOD

Example 1

Method of Oligonucleotide Synthesis and Assembly Implemented on a Digital Microfluidic Device Enzymatic oligonucleotide synthesis and subsequent assembly into longer nucleic acids can be performed on digital microfluidic devices. Digital microfluidic devices consist of a plurality of electrodes arranged on a surface. A dielectric layer (e.g., aluminum oxide) is deposited over the electrodes followed by a hydrophobic coating (e.g., perfluorinated hydrocarbon polymer) atop the dielectric layer. The electrodes may be hardwired or formed from an active matrix thin film transistor (AM-TFT).

Depending on applied voltage to a subset of the plurality of electrodes arranged on the aforementioned surface, aqueous droplets may be actuated across the surface immersed in oil, air, or another fluid. Enzymatic oligonucleotide synthesis can be deployed on a digital microfluidic device in several ways. An initiator oligonucleotide can be immobilized via the 5'-end on super paramagnetic beads or directly to the hydrophobic surface of the digital microfluidic device. A plurality of distinct positions containing immobilized initiator oligonucleotides on the digital microfluidic device may be present (henceforth named synthesis zones). Solutions required for enzymatic oligonucleotide synthesis are then dispensed from multiple reservoirs onto the device. Briefly, an addition solution containing the components necessary for the TdT-mediated incorporation of reversibly terminated nucleoside 5'-triphosphates onto immobilized initiator oligonucleotides can be dispensed from a reservoir in droplets and actuated to the aforementioned positions containing immobilized initiator oligonucleotides. During this stage, each reservoir (and thus each droplet containing addition solution) can contain a distinct nitrogenous base reversibly terminated nucleoside 5'-triphosphate identity or a mixture thereof in order to control the sequence synthesized on aforementioned positions containing immobilized initiator oligonucleotides.

After the addition step, the droplets containing addition solution can be actuated off of the synthesis zones. A new droplet from a reservoir containing a wash solution can be actuated to the synthesis zones multiple times to wash the zone. Then, a new droplet from a reservoir containing a deblocking solution to deblock or unmask the reversibly terminated nucleoside 5'-triphosphate is actuated to the synthesis zones to deblock or unmask the added reversibly terminated nucleoside 5'-triphosphate. A new droplet from the aforementioned reservoir containing a wash solution or from a new reservoir containing a new wash solution can be actuated to the synthesis zone to wash the zone. The cycle of addition—wash—deblock—wash can be repeated until the desired nucleic acid is synthesized. Other processes can be added to the cycle to improve synthesis quality and purity, such as a capping step after the addition and/or deblocking step. The capping step after the deblocking step can involve the use of dibenzylcyclooctyne as a capping agent for nucleoside 5'-triphosphates reversibly terminated with 3'-O-azidomethyl or the use of acetone as a capping agent for nucleoside 5'-triphosphates reversibly terminated with 3'-aminoxy.

Following the completion of synthesis in each synthesis zone on the digital microfluidic device, the immobilized synthesized oligonucleotide can be cleaved into a droplet by a droplet actuated from a reservoir containing harvest solution. Scarless cleavage can be accomplished by using nucleic acid glycosylases, such as uracil DNA glycosylase or formamidopyrimidine DNA glycosylase under basic pH, heat, or in the presence of an amine. All synthesis zones are cleaved in such a manner with actuated droplets immediately after the completion of synthesis except for specific synthesis zones henceforth termed anchor zones.

The synthesis zones that have been cleaved with harvest droplets are combined with harvest droplets from other synthesis zones; between 2-10 harvest droplets are combined together through digital microfluidic droplet actuation representing synthesized nucleic acids that are complementary to each other. A gapped or ungapped nucleic acid assembly process (e.g., splint ligation or polymerase chain assembly) is then used to covalently link the hybridized nucleic acids together by actuating droplets from reservoirs containing necessary reagents to perform nucleic acid assembly. Simultaneously, 2-10 harvest droplets are combined together from other synthesis zones representing synthesized nucleic acids that are complementary to each other until all cleaved synthesis zones have been assembled into longer nucleic acids (Stage 1 assembly).

Immobilized Taq MutS protein can be introduced by droplet actuation to each Stage 1 assembly droplet to remove mismatched nucleic acids. In doing so, error rates from enzymatic nucleic acid synthesis can be dramatically reduced. Following Stage 1 assembly, assembled nucleic acids are then introduced to anchor zones by droplet actuation for solid-phase nucleic acid assembly (Stage 2 assembly). Assembly can be effected by the same assembly process used in Stage 1. One to ten Stage 1 harvest droplets can be introduced to the anchor positions. Solid phase assembly in Stage 2 is repeated until all Stage 1 harvest droplets have been actuated and it nucleic acid components assembled with anchor zone immobilized oligonucleotides.

Anchor zone oligonucleotides are then cleaved using a glycosylase that is orthogonal to the glycosylase used in harvesting oligonucleotides from synthesis zones for Stage 1 assembly. The orthogonal glycosylase can be introduced by droplet actuation from reservoir containing said orthogonal glycosylase. Anchor zone cleaved oligonucleotides can be assembled into a longer piece of nucleic acid or directly output to the end-user by droplet actuation.

Example 2

Method of Oligonucleotide Synthesis and Assembly Implemented on a Continuous Flow Microfluidic Device Enzymatic nucleic acid synthesis and subsequent assembly can be implemented on continuous flow microfluidic devices. One such device consists of a surface with a plurality of microwells each containing a bead. On said bead, an oligonucleotide initiator can be immobilized by the 5'-end. In addition to each microwell containing a bead with immobilized initiator, each microwell will contain an electrode to perform electrochemistry.

To begin synthesis, addition solution containing all necessary components to perform TdT-mediated incorporation of reversibly terminated nucleoside 5'-triphosphates can be introduced to the surface via continuous flow driven by a pump from a microfluidic reservoir. The addition solution can contain a distinct nitrogenous base reversibly terminated nucleoside 5'-triphosphate identity or a mixture thereof in order to control the sequence synthesized on aforementioned beads containing immobilized initiator oligonucleotides.

For example, in the first cycle, a 3'-aminoxy nucleoside 5'-triphosphate with a nitrogenous base that is cleavable by a glycosylase is added by TdT to all beads. A wash solution is then introduced to wash all the addition components off of the surface. Afterwards, a deblocking solution containing sodium nitrite and an electrochemically-generated acid is then introduced under continuous flow. The deblocking solution is inactive by virtue of a neutral to basic pH. Locally, each microwell containing a bead with an oligonucleotide that requires addition by dATP (the first base to be added) due to the sequence requirements of the end-user will activate the electrode. By virtue of the electrochemically-generated acid present in the deblocking solution, the local pH within a microwell will become acidic, thereby allowing acidic nitrite deprotection of the 3'-aminoxy reversible terminator. However, only positions with activated electrodes will result in deblocking; thus, addressable incorporation of reversibly terminated nucleoside 5'-triphosphates is achieved.

Following addition of the first deblocking solution, the following solutions are added in the following order under continuous flow from unique microfluidic reservoirs: wash solution, addition solution containing 3'-ONH$_2$ dATP, wash solution, inactive deblocking solution, wash solution, addition solution containing 3'-ONH$_2$ dTTP, wash solution, inactive deblocking solution, wash solution, addition solution containing 3'-ONH$_2$ dGTP, wash solution, inactive deblocking solution, wash solution, addition solution containing 3'-ONH$_2$ dCTP, and wash solution. After the aforementioned solutions are flowed through, 1 cycle of synthesis is completed (i.e., every immobilized initiator has been addressably extended by at least 1 nucleotide).

The aforementioned process is repeated until a plurality of immobilized oligonucleotides containing desired sequences are synthesized. Water electrolysis can then be performed at each microwell to generate gas bubbles of molecular oxygen and hydrogen to selectively elute beads contained within a microwell. Selectively eluted beads contain oligonucleotides that can be assembled together into longer pieces of nucleic acids via gapped or ungapped nucleic acid assembly processes. Selectively eluted beads are pooled into a solution, and the immobilized oligonucleotides are cleaved at the aforementioned base capable of being deglycosylated by a deglycosylase. A plurality of beads may contain immobilized oligonucleotides with an orthogonally deglycosylated base. These beads are termed anchor beads; assembly processes can thus be performed in a solid-phase manner. The aforementioned assembly is termed Stage 1.

Additional beads are then eluted from the microwell surface and cleaved with a glycosylase. These beads also only consist of oligonucleotides that are complementary to each other for the purpose of nucleic acid assembly. The assembled nucleic acids resulting from this cleavage can then be introduced to Stage 1 assembled nucleic acids immobilized on anchor beads. This assembly process is termed Stage 2. The assembly process occurs again with a new set of beads selectively eluted from the microwell surface until the desired nucleic acid is synthesized (Stage N).

After assembly from Stage 1 to Stage N, the anchored assembly is cleaved with the aforementioned orthogonal nucleic acid glycosylase. The assembly is then retrieved by the end-user from the microfluidic device.

DETAILED EXAMPLES

Synthesis

An initiator oligonucleotide sequence (SEQ ID 12) was immobilized on a solid support (superparamagnetic particles). Enzymatic synthesis was performed using an engineered terminal deoxynucleotidyl transferase (TdT) enzyme and reversibly terminated nucleoside triphosphates. The process of enzymatic synthesis was performed on a DB3-120 system (SciBots Inc). This system is an electro-wetting on dielectric (EWOD)-based digital microfluidic platform. The synthesis process involves automated iterations of (I) TdT-mediated addition of a reversibly terminated nucleoside triphosphate; (II) washing with a high salt buffered solution; (III) deblocking of the reversible terminator; (IV) washing with a high salt buffered solution. Following synthesis, DNA was recovered from the beads by removing a uracil present in the initiator with uracil DNA glycosylase (UDG) and cleaving the generated abasic site with endonuclease VIII. Analysis was via denaturing polyacrylamide gel electrophoresis (PAGE) and visualization was achieved through an internal TAMRA dye in the initiator oligonucleotide (FIG. 1). Lane 1 shows an initiator oligonucleotide sequence that did not undergo synthesis cycles. Lane 2 shows an initiator oligonucleotide sequence that underwent two cycles of automated enzymatic synthesis on the DB3-120 system. The major band exhibits an increase of length by two nucleotides, clearly showing successful enzymatic synthesis has occurred on the device.

100 μg of superparamagnetic particles functionalised with an initiator oligonucleotide of SEQ ID 12 were used in this example. Each droplet delivered to the immobilised initiator oligonucleotide was 0.75 μL in volume. Droplets were delivered through electrokinesis enabled by actuation at 80 V, 1000 Hz by the DB3-120 system. The temperature during the process was held constant at 30° C. In step (I), a 0.75 μL droplet containing an engineered TdT, a neutral pH buffer, a divalent, and an aminooxy reversibly terminated nucleoside triphosphate was contacted with the 100 μg of superparamagnetic particles and incubated for 5 minutes. Step (II) involved two washes with 0.75 μL droplets of high salt solution. In step (III), the superparamagnetic particles were exposed to a 0.75 μL droplet of acidic aqueous sodium nitrite for 5 minutes. Step (IV) involved two washes with 0.75 μL droplets of high salt solution.

Assembly

This application describes how a plurality of oligonucleotide components can be synthesized from an immobilized initiator oligonucleotide. Furthermore, a subset of these synthesized oligonucleotide components can then be cleaved into solution, while another subset remains immobilized. The solution synthesized oligonucleotide components may then be hybridized and ligated to the immobilized synthesized oligonucleotide component to prepare a longer contiguous oligonucleotide sequence. In this example, eight oligonucleotide components cleaved into solution have been assembled onto a single immobilized oligonucleotide component to yield a contiguous oligonucleotide sequence. FIG. 5 shows a schematic of how oligonucleotides of SEQ IDs 2-9 are assembled into a contiguous oligonucleotide with the solid support immobilized oligonucleotide of SEQ ID 10.

Figure 2:
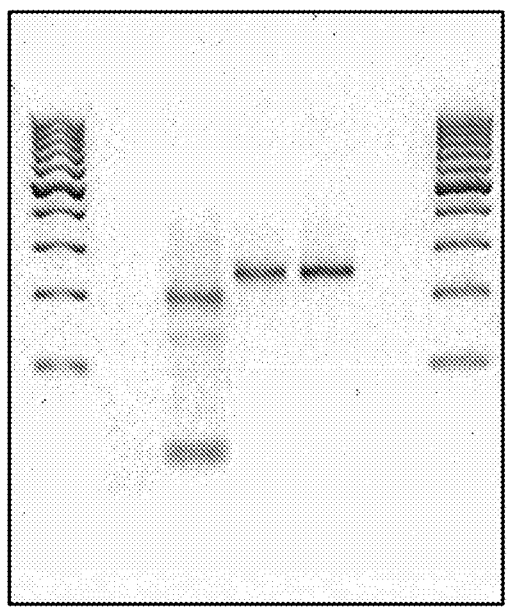
FIG. 2: Agarose gel image of products generated by automated assembly of cleaved oligonucleotide components in solution into a contiguous oligonucleotide sequence on a solid support. DNA was visualized by the presence of SYBR Safe in the agarose gel.

Eight cleaved oligonucleotide components (SEQ IDs 2-9) were assembled onto a single NeutrAvidin-bead immobilized oligonucleotide (SEQ ID 10) component to yield a contiguous oligonucleotide sequence. This process was performed in an automated fashion on a DB3-120 system (SciBots Inc). This system is an electro-wetting on dielectric (EWOD)-based digital microfluidic platform. The contiguous oligonucleotide sequence was then removed from the solid support by heating to 95° C. A portion of the assembled contiguous sequence was amplified by polymerase chain reaction (PCR). Analysis of the un-amplified and amplified reaction mixtures was performed by gel electrophoresis. Electrophoresis was performed at 125V on a 2.5% agarose gel pre-stained with 1× SYBR Safe with 1× TBE running buffer (FIG. 2). Lane 1 contains a 100 base pair GeneRuler ladder. Lane 2 contains a mixture of oligonucleotides 1-8. Lane 3 contains reaction mixture following assembly on EWOD-platform. The lower band indicates TAMRA-labelled oligonucleotide (SEQ ID 10) and topmost band indicates the fully assembled contiguous sequence formed from oligonucleotides 2-9. Lane 4 is the PCR product of lane 3 using primers designed to introduce a 43 base pair flanking sequence. Lane 5 is a positive control DNA sequence for correct assembly. Lane 6 is a no template control (NTC) for the PCR amplification. Lane 7 contains a 100 base pair GeneRuler ladder.

Internally biotinylated oligonucleotide (SEQ ID 10) was immobilized on 1 μm NeutrAvidin paramagnetic beads. On a DB3-120 (SciBots) electrowetting on dielectric digital (EWOD) microfluidic system, a droplet containing functionalized NeutrAvidin beads was combined with droplets containing oligonucleotides of SEQ ID 2-9 at 375 nM each, 0.1% tween-20, ligation buffer (tris-HCl, $MgCl_2$, DTT, ATP, PEG6000), and T4 DNA ligase. Dodecane was used as a carrier fluid on the DB3-120. The combined droplet was mixed via actuation at 80 V, 1000 Hz for a total of 34 minutes. Assembly was enabled by heating the microfluidic chip at 65° C. for 5 minutes and then allowing it to cool to room temperature. Beads were pelleted with a magnet to isolated them from the reaction mixture droplet. The beads were then washed twice with a high salt solution (1 M NaCl, 0.1% tween-20). Only assembled oligonucleotide containing SEQ ID 10 will remain on the beads after the washing step. Washed beads were treated with proteinase K to destroy any remaining T4 DNA ligase and then heated to 95° C. to recover the majority of the immobilized assembled DNA.

A portion of the bead eluate (0.5 ul of a 10-fold dilution) was amplified by polymerase chain reaction (PCR) with PrimeSTAR Max DNA Polymerase (Takara Bio Inc). One of the primers used in this reaction (SEQ ID 10) contains a flanking region to facilitate subsequent next-generation sequencing. Only fully assembled contiguous oligonucleotides will be amplified using SEQ IDs 9 and 10. PCR was carried out for 30 cycles of 98° C. for 10 seconds, 55° C. for 5 seconds and 72° C. for 5 seconds with the lid heated to 105° C.

Analysis was by gel electrophoresis on a 2.5% agarose gel pre-stained with 1× SYBR Safe. The gel was run at 125 V for 45 minutes in 1× TBE running buffer. The following samples were loaded on the gel: (1) 100 base pair GeneRuler™ DNA ladder (lowest band 100 bp and highest 1,000 bp); (2) 2.25 ul of the initial oligo preparation containing SEQ IDs 2-9); (3) the remaining volume of bead eluate; (4) 5 ul of PCR product; (5) 5 ul of positive control; (6) 5 ul of PCR no template control; (7) 100 base pair GeneRuler™ DNA ladder. The gel was imaged on a transilluminator. The resultant gel is FIG. 2.

FIG. 2 clearly shows the successful preparation of a contiguous oligonucleotide sequence from component oligonucleotide sequences. Lane 2 contains a mixture of oligonucleotides of SEQ ID 2-9. These oligonucleotides are not visible as they are single stranded and SYBR Safe is an intercalating dye for double-stranded DNA. Lane 3 shows DNA material recovered in the bead eluant. The topmost band corresponds to the correct molecular weight of the fully assembled product of SEQ IDs 2-10 (199 base pairs). To confirm the identity of the fully assembled product, PCR was performed with primers corresponding to the 5' and 3' terminal ends of the assembled product. Lane 4 shows one specific amplicon from this PCR at the expected molecular weight (248 base pairs). The molecular weight of this amplicon perfectly matches that of the positive control for the fully assembled sequence plus the amplification tags (lane 5). The only way the full sequence could be formed is if all eight solution oligos (SEQ IDs 2-9) correctly hybridized and were ligated with each other and the immobilized oligo (SEQ ID 10).

Figure 3:
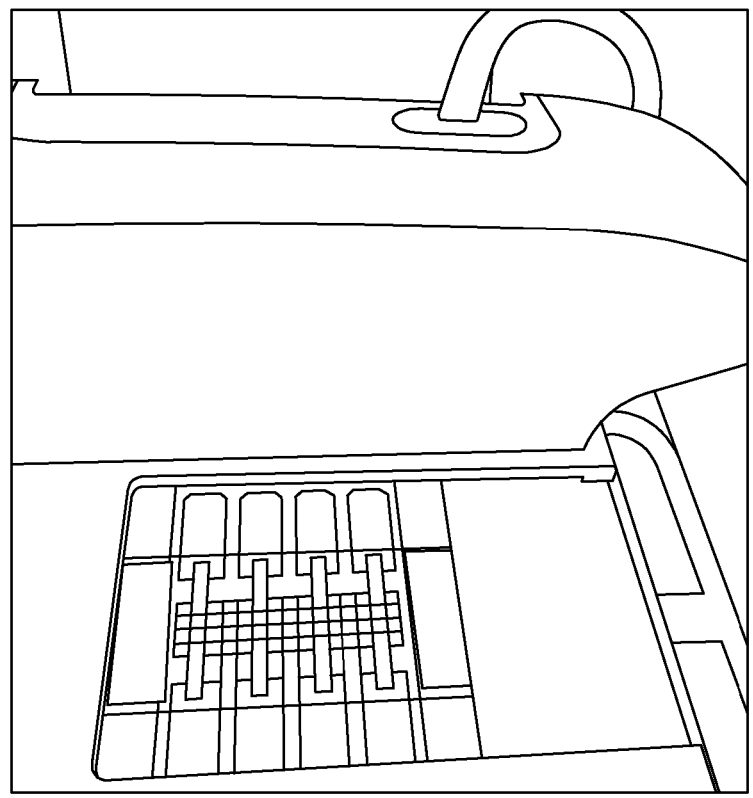
FIG. 3: Segmented electrode DMF platform (DB3-120 from SciBots) used to perform automated enzymatic synthesis from an oligonucleotide initiator immobilised on superparamagnetic particles.

An image of the experimental set-up used for enzymatic synthesis of oligonucleotides from an immobilised oligonucleotide initiator is shown in FIG. 3. The segmented electrode DMF platform (DB3-120 from SciBots) was covered with a carrier fluid (dodecane) and a glass cover slip. The droplet visible in the centre of the chip is the reaction zone where the DNA product in FIG. 1 was synthesised.

Figure 4:
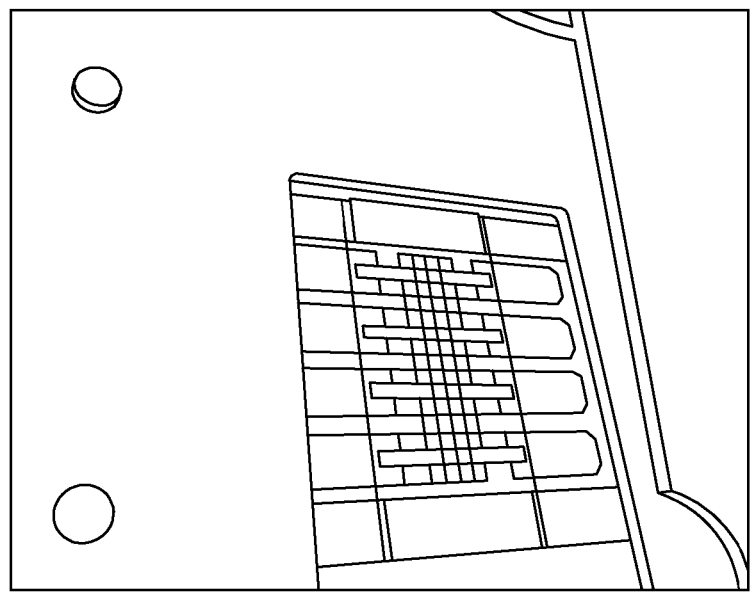
FIG. 4: Segmented electrode DMF platform (DB3-120 from SciBots) used to perform enzymatic assembly of cleaved oligonucleotide components onto an immobilized oligonucleotide.

An image of the experimental set-up used for solid-supported assembly of oligonucleotides into a contiguous sequence is shown in FIG. 4. The segmented electrode DMF platform (DB3-120 from SciBots) was used to perform assembly of cleaved oligonucleotide components onto an immobilized oligonucleotide. The segmented electrodes were covered with a carrier fluid (dodecane) and a glass cover slip. Reservoirs (left of chip) and reaction droplets (centre of chip) are visible. The entire glass structure was heated to 65° C. to facilitate the assembly process.

| SEQ IDS | |
|---|---|
| SEQ ID 2 | /5Phos/ATGGGTAGCAGCCATCACCATCA/i5-TAMK/CATCATA |
| SEQ ID 3 | /5Phos/CAACTGCCAGAATTTCTTTGTTCATGCTGCTATGATGATGATGGTGAT |
| SEQ ID 4 | /5Phos/GCAGCATGAACAAAGAAATTCTGGCAGTTGTTGAAGCCGTGAGCAATG |
| SEQ ID 5 | /5Phos/CACGAGGCAGTGCTTTTTCATTGCTCACGGCTTCAA |
| SEQ ID 6 | /5Phos/AAAAAGCACTGCCTCGTGAAAAAATCTTTGAAGCACTGGAAAGC |
| SEQ ID 7 | /5Phos/TTTTGGTTGCGGTTGCCAGTGCGCTTTCCAGTGCTTCAAAGATTTTTT |
| SEQ ID 8 | /5Phos/GCACTGGCAACCGCAACCAAAAAAAAGTATGAACAAGAGATTGA |
| SEQ ID 9 | /5Phos/ACGATCAATCTGCACGCGCACATCAATCTCTTGTTCATACTTTT |
| SEQ ID 10 | /5Phos/GGCTGCTACCCATAGATCGGAAGAGCGTTTTT/iBiodT/TTTTACGCTCTTCCGATCUA |
| SEQ ID 11 | AATGATACGGCGACCACCGAGATCTACACTCTTTCCCTACACGACGCTCTTCCGATCT |
| SEQ ID 12 | T*T*T*TTTTTTTTACACGACGCTCTUCCGATCTAGCT/i6-TAMN/CAGTTTT |

The invention claimed is:

1. A method for preparing a contiguous oligonucleotide sequence of at least 4n bases in length, the method comprising:
   a. taking a device with a plurality of immobilised initiation oligonucleotide sequences, one or more of which contains a cleavage site;
   b. using the initiation oligonucleotide sequences to synthesise a plurality of immobilised oligonucleotide sequences of at least n bases in length, using cycles of extension of reversibly blocked nucleotide monomers;
   c. selectively cleaving at least four of the immobilised oligonucleotide sequences of at least n bases in length into solution whilst leaving two or more of the immobilised oligonucleotide sequences attached;
   d. hybridizing the cleaved and immobilised oligonucleotides to each other, to form splints on at least two of the immobilized oligonucleotide sequences;
   e. joining at least one of the cleaved oligonucleotides to at least two of the immobilised oligonucleotide sequences, thereby preparing two separate contiguous oligonucleotide sequences of at least 2n bases in length;
   f. performing a further cleavage step of selectively cleaving at least one of the immobilised oligonucleotide sequences of at least 2n bases in length into solution whilst leaving one or more of the immobilised oligonucleotide sequences attached;
   g. further hybridizing at least one of the cleaved oligonucleotides to the cleaved oligonucleotide sequences of at least 2n bases, to form a splint on at least one of the immobilized oligonucleotide sequences of at least 2n bases; and
   h. further joining at least one of the cleaved oligonucleotides of at least 2n bases to the immobilised oligonucleotide sequences of at least 2n bases, thereby preparing a further contiguous oligonucleotide sequence of at least 4n bases in length.

2. A method according to claim 1 wherein each of the two separate contiguous oligonucleotide sequences are at least 3n bases in length and the further contiguous oligonucleotide sequence is of at least 6n bases in length, the method comprising:
   a. taking a device with a plurality of immobilised initiation oligonucleotides, 4 or more of which contain a cleavage site;
   b. using the initiation oligonucleotides to synthesise a plurality of at least 5 immobilised oligonucleotides of at least n bases in length, using cycles of extension of reversibly blocked nucleotide monomers;
   c. selectively cleaving at least 4 of the immobilised oligonucleotides of at least n bases in length into solution whilst leaving one or more of the immobilised oligonucleotides attached;
   d. hybridizing the cleaved oligonucleotides and immobilised oligonucleotides to each other, to form a series of at least 2 splints;
   e. joining at least 2 of the cleaved oligonucleotides to the immobilised oligonucleotide, thereby preparing a contiguous oligonucleotide sequence of at least 3n bases in length;
   f. performing a further cleavage step of selectively cleaving at least one of the immobilised oligonucleotide sequences of at least 3n bases in length into solution whilst leaving one or more of the immobilised oligonucleotide sequences attached; and;

g. joining two of the contiguous oligonucleotide sequence of at least 3n bases in length together to form a further contiguous oligonucleotide sequence of at least 6n bases in length.

3. The method of claim 1, further comprising an additional step of in situ error correction of hybridised oligonucleotides to remove sequences having base-pairing mismatch errors, wherein error correction is performed using a mismatch recognising protein or a base specific nucleic acid glycosylase.

4. The method of claim 1, wherein the cycles of extension are performed using a template independent polymerase and the nucleotide monomers are nucleoside triphosphates.

5. The method of claim 1, wherein the cycles of extension are performed using chemical synthesis and the nucleotide monomers are nucleoside phosphoramidates.

6. The method of claim 3, wherein the mismatch recognising protein MutS, MutS-MutL, MutS-MutL-MutH, *E. coli* endonuclease V, T4 endonuclease VII, CEL endonuclease, and/or T7 endonuclease I; or the base specific nucleic acid glycosylase is uracil DNA glycosylase (UDG), hAAG, and/or formamidopyrimidine DNA glycosylase (Fpg), hypoxanthine DNA glycosylase, xanthine DNA glycosylase.

7. The method of claim 6, wherein the mismatch recognising protein is immobilised to a solid support for pull-down of error-prone sequences.

8. The method of claim 1, wherein hybridisation of splints with immobilized oligonucleotides results in a gap which is filled in by a nucleic acid polymerase.

9. The method of claim 1, wherein n is at least 25 bases.

10. The method of claim 1, wherein the contiguous oligonucleotide sequence is at least 10n bases in length.

11. The method of claim 1, further comprising an amplification step in which the contiguous oligonucleotide is amplified using primers in solution, thereby amplifying the contiguous oligonucleotide whilst leaving the immobilised oligonucleotide sequences.

12. The method of claim 1, wherein the contiguous oligonucleotide is released from being immobilized.

13. The method of claim 1, wherein the selective cleaving occurs by removing a non-canonical base from one or more of the immobilised oligonucleotides and cleaving the strands at the resultant abasic site.

14. The method according to claim 13, wherein the non-canonical base is uracil or 8-oxoguanine which are removed by uracil DNA glycosylase and formamidopyrimidine DNA glycosylase, respectively.

15. The method of claim 1, wherein the device contains a population of beads onto which the plurality of immobilised initiation oligonucleotides are attached, a portion of the beads are cleaved to release the oligonucleotides of length n into separate solutions and a subset of the solutions are mixed with the remaining beads.

16. The method of claim 1, comprising assembly of a double stranded region of at least 20n bases in length by a process comprising:
a. using the initiation oligonucleotides to synthesise at least 41 immobilised oligonucleotides of at least n bases in length, using cycles of extension of reversibly blocked nucleotide monomers;
b. selectively cleaving at least 40 of the immobilised oligonucleotides of at least n bases in length into a reaction solution whilst leaving at least one of the immobilised oligonucleotides attached;
c. hybridizing the cleaved oligonucleotides to each other, to form a series of at least 20 splints, and hybridizing one of the terminal splints to one of the immobilized oligonucleotides;
d. joining at least 20 of the splints, which are arranged in a series, to each other and to the immobilised oligonucleotide of at least n bases in length, thereby preparing a contiguous double stranded oligonucleotide of at least 20n bases in length;
wherein the resulting contiguous nucleotide sequence is at least 500 bases in length.

17. The method according to claim 1, wherein the reversibly blocked nucleoside triphosphates are 3'-reversibly blocked nucleoside triphosphates and wherein the 3'-reversible block is selected from 3'-O—CH$_2$N$_3$, 3'-O—CH$_2$CHCH$_2$, 3'-O—CH$_2$CH$_2$CN, 3'-O—N=C(CH$_3$)$_2$, 3'-O—NH$_2$, 3'-phosphate, 3'-ortho-nitrobenzyl, or 3'-para-nitrobenzyl.

18. The method according to claim 1, wherein the device is a digital microfluidic device.

19. The method according to claim 18 wherein the digital microfluidic device is an active matrix thin film transistor.

20. A kit for preparing a contiguous oligonucleotide sequence of at least 2n bases in length, the kit comprising:
a. a plurality of 5'-immobilised initiation oligonucleotides, one or more of which contains a uracil or 8-oxoguanine;
b. 3'-reversibly blocked nucleoside triphosphates, wherein the 3'-reversible block is selected from 3'-O—CH$_2$N$_3$, 3'-O—CH$_2$CHCH$_2$, 3'-O—CH$_2$CH$_2$CN, 3'-O—N=C(CH$_3$)$_2$ 3'-O—NH$_2$, 3'-phosphate, 3'-ortho-nitrobenzyl, and 3'-para-nitrobenzyl;
c. uracil DNA glycosylase or formamidopyrimidine DNA glycosylase;
d. optionally a mismatch recognising protein;
e. a nucleic acid ligase; and
f. a template independent polymerase.

* * * * *